United States Patent
Mochizuki

(10) Patent No.: US 10,301,473 B2
(45) Date of Patent: May 28, 2019

(54) FLAME-RETARDANT POLYORGANOSILOXANE COMPOSITION, FLAME-RETARDANT CURED PRODUCT, OPTICAL MEMBER, LIGHT SOURCE LENS OR COVER, AND MOLDING METHOD

(71) Applicant: MOMENTIVE PERFORMANCE MATERIALS JAPAN LLC, Minato-ku, Tokyo (JP)

(72) Inventor: Kikuo Mochizuki, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 14 days.

(21) Appl. No.: 15/623,958

(22) Filed: Jun. 15, 2017

(65) Prior Publication Data
US 2017/0283613 A1 Oct. 5, 2017

Related U.S. Application Data

(63) Continuation of application No. PCT/JP2015/085500, filed on Dec. 18, 2015.

(30) Foreign Application Priority Data

Dec. 18, 2014 (JP) ................................. 2014-255835
Dec. 18, 2014 (JP) ................................. 2014-255836
Dec. 18, 2014 (JP) ................................. 2014-255837

(51) Int. Cl.
| | |
|---|---|
| C08G 77/20 | (2006.01) |
| C08L 83/04 | (2006.01) |
| F21V 3/06 | (2018.01) |
| C08K 5/521 | (2006.01) |
| C08K 5/524 | (2006.01) |
| G02B 1/04 | (2006.01) |
| C08G 77/06 | (2006.01) |
| F21V 25/12 | (2006.01) |
| B29C 43/00 | (2006.01) |
| B29C 45/00 | (2006.01) |
| F21Y 115/10 | (2016.01) |
| B29K 83/00 | (2006.01) |
| B29L 11/00 | (2006.01) |

(52) U.S. Cl.
CPC ............ *C08L 83/04* (2013.01); *B29C 43/003* (2013.01); *B29C 45/0001* (2013.01); *C08G 77/06* (2013.01); *C08G 77/20* (2013.01); *C08K 5/521* (2013.01); *C08K 5/524* (2013.01); *F21V 3/06* (2018.02); *F21V 3/062* (2018.02); *F21V 25/12* (2013.01); *G02B 1/04* (2013.01); *G02B 1/041* (2013.01); *B29K 2083/00* (2013.01); *B29L 2011/00* (2013.01); *C08L 2205/025* (2013.01); *C08L 2205/03* (2013.01); *C08L 2205/06* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2,676,182 | A * | 4/1954 | Daudt | C08G 77/06 106/287.1 |
| 3,635,874 | A | 1/1972 | Laur et al. | |
| 3,652,488 | A | 3/1972 | Harder | |
| 4,472,563 | A * | 9/1984 | Chandra | C08K 5/54 528/15 |
| 4,882,398 | A * | 11/1989 | Mbah | C08L 83/04 525/478 |
| 5,122,562 | A * | 6/1992 | Jeram | C08K 5/14 524/403 |
| 5,548,038 | A * | 8/1996 | Enami | C08L 83/04 525/478 |
| 5,932,668 | A * | 8/1999 | Friebe | C08G 77/20 257/E23.12 |
| 2006/0264567 | A1 | 11/2006 | Shiobara et al. | |
| 2006/0264583 | A1 | 11/2006 | Kashiwagi et al. | |
| 2007/0106016 | A1* | 5/2007 | Zhu | A43B 13/04 524/588 |
| 2009/0281243 | A1 | 11/2009 | Takanashi et al. | |
| 2009/0305036 | A1* | 12/2009 | Aoki | C09J 183/04 428/356 |
| 2010/0197870 | A1 | 8/2010 | Kashiwagi et al. | |
| 2011/0281123 | A1 | 11/2011 | Yoshida et al. | |
| 2011/0294950 | A1 | 12/2011 | Hasegawa et al. | |
| 2012/0029151 | A1 | 2/2012 | Takanashi et al. | |
| 2012/0065343 | A1* | 3/2012 | Bahadur | C08L 83/04 525/478 |
| 2014/0275384 | A1 | 9/2014 | Takahashi | |
| 2016/0280918 | A1* | 9/2016 | Kumar | C09J 183/04 |

FOREIGN PATENT DOCUMENTS

| | | |
|---|---|---|
| EP | 1 845 133 A1 | 10/2007 |
| JP | H11-140319 A | 5/1999 |

(Continued)

OTHER PUBLICATIONS

Machine translation of JP-2014185229, 11 pages, translation generated Apr. 2018. (Year: 2018).*

(Continued)

*Primary Examiner* — Robert S Loewe
(74) *Attorney, Agent, or Firm* — Foley & Lardner LLP

(57) ABSTRACT

This flame-retardant polyorganosiloxane includes (A) a straight-chain polyorganosiloxane having two or more alkenyl groups in one molecule and whose viscosity (25° C.) is 10,000 to 1,000,000 mPa·s; (B) 30 to 80 mass % of a resinoid polyorganosiloxane which includes Q unit and has 1.5 or more alkenyl groups on average, and in which a molar ratio of alkoxy groups to alkyl groups is 0.030 or less; (C) an amount of a polyorganohydrogensiloxane, whose average degree of polymerization is 10 or more, and in which a Si—H content is 5.0 mmol/g or more, in which Si—H/(a total of alkenyl groups) is 1.0 to 3.0 mol; and (D) a hydrosilylation reaction catalyst. A flame-retardant polyorganosiloxane composition capable of reducing an amount of a platinum-based metal compound is provided.

22 Claims, No Drawings

(56) References Cited

FOREIGN PATENT DOCUMENTS

| JP | H11-140320 | A | | 5/1999 | | |
|---|---|---|---|---|---|---|
| JP | 2006-328102 | A | | 12/2006 | | |
| JP | 2006-328103 | A | | 12/2006 | | |
| JP | 2006-335857 | A | | 12/2006 | | |
| JP | 2007-038443 | A | | 2/2007 | | |
| JP | 2008-127517 | A | | 6/2008 | | |
| JP | 2010-047646 | A | | 6/2008 | | |
| JP | 4697405 | B2 | | 6/2011 | | |
| JP | 5475295 | B2 | | 4/2014 | | |
| JP | 2014-125624 | A | | 7/2014 | | |
| JP | 5568240 | B2 | | 8/2014 | | |
| JP | 2014185229 | A | * | 10/2014 | ............. | C08L 83/07 |
| WO | WO-2008/047892 | A1 | | 4/2008 | | |
| WO | WO-2013/084699 | A1 | | 6/2013 | | |

OTHER PUBLICATIONS

Gelest catalog for polysiloxane materials, 2004, 64 pages. (Year: 2004).*

* cited by examiner

FLAME-RETARDANT POLYORGANOSILOXANE COMPOSITION, FLAME-RETARDANT CURED PRODUCT, OPTICAL MEMBER, LIGHT SOURCE LENS OR COVER, AND MOLDING METHOD

CROSS-REFERENCE TO RELATED APPLICATIONS

This application is a continuation of prior International Application No. PCT/JP2015/085500 filed on Dec. 18, 2015, which is based upon and claims the benefit of priority from Japanese Patent Applications Nos.2014-255835 filed on Dec. 18, 2014, 2014-255836 filed on Dec. 18, 2014, and 2014-255837 filed on Dec. 18, 2014; the entire contents of all of which are incorporated herein by reference.

FIELD

The present invention relates to a flame-retardant polyorganosiloxane composition, a flame-retardant cured product, an optical member, a light source lens or cover, and a molding method, and in particular relates to an additional reaction curing-type polyorganosiloxane composition by which a cured product excellent in flame retardancy is formed, a flame-retardant cured product made by curing the polyorganosiloxane composition, an optical member, a light source lens or cover, and a molding method.

BACKGROUND

Conventionally, polyorganosiloxane compositions curing into silicone rubber have been well known, and are widely used as a potting material, a coating material, a molding material for shaping, injection molding and so on, and a covering material in an electric and electronic field, and optical and optoelectronics, sensor, architecture fields, utilizing its excellent properties such as weather resistance, heat resistance, electrical insulation, hardness, mechanical strength, elongation and so on. Above all, a polyorganosiloxane composition which is cured by an additional reaction is cured rapidly by appropriate heating and a corrosive substance and the like are not emitted at a time of the curing, so that a use in each of the fields spreads.

As a technique of imparting flame retardancy to such an additional reaction curing-type polyorganosiloxane composition, conventionally, addition of a platinum-based metal compound has been performed. However, when it is intended to obtain sufficient flame retardancy, an addition amount of the platinum-based metal compound is to be increased, so that there has been a problem that transparency becomes poor, such as discoloration (yellowing) of a cured product. Further, from the viewpoint of a material cost, it is required that the addition amount of the platinum-based metal compound is reduced as small as possible.

In order to improve the flame retardancy, methods (refer to Patent Reference 1 (U.S. Pat. No. 3,652,488) and Patent Reference 2 (U.S. Pat. No. 3,635,874), for example.) of compounding carbon black or titanium oxide, a method (refer to Patent Reference 3 (JP-A Hei 11-140320), for example.) of compounding a flame retardant other than a platinum-based compound, such as phosphoric acid ester or phosphite, and the like are carried out.

However, in the methods described in Patent Reference 1 and Patent Reference 2, not only decreases in other physical properties easily occur, but also a transparent cured product cannot be obtained by coloring of compositions, so that it is difficult to use for a sealant for a light emitting device and optical materials such as a lens and a cover, or the like and thereby a use is limited. Further, there has been a defect in which flame retardancy decreases with time.

Further, in a method described in Patent Reference 3, compatibility with a flame retardant is not sufficient depending on the type of a base polymer, so that there have been problems that the flame retardant easily separates, a cured product easily discolors (yellows) with time, and the like.

Moreover, as curable silicone compositions, a silicone composition has been proposed, as a curing silicone composition, which contains an alkenyl group-containing organopolysiloxane composed of a dialkylpolysiloxane having two or more alkenyl groups, on average, in a molecule and having a predetermined viscosity and an organopolysiloxane having a tetrafunctional siloxane unit and containing a alkenyl group at a predetermined rate as a main component, an organohydrogenpolysiloxane having a tetrafunctional siloxane unit and containing a silicon atom-bonded hydrogen atom at a predetermined rate, and a hydrosilylation reaction catalyst, and having a hardness of 30 or more and 80 or less and an elongation of 50% or more (in conformity with JIS K6253), or having a hardness of 75 or less and an elongation of 35% or more (for example, refer to Patent Reference 4 (Japanese Patent No. 5475295) and Patent Reference 5 (Japanese Patent No. 5568240).).

However, the compositions described in Patent Reference 4 and Patent Reference 5 have been excellent in mechanical strength (hardness and elongation) of cured products, but have not had sufficient flame retardancy.

SUMMARY OF THE INVENTION

The present invention has been made to solve these problems, and an object thereof is to provide a polyorganosiloxane composition in which excellent flame retardancy can be obtained, physical properties of a cured product are good, and coloring and discoloration (yellowing) are suppressed, even without addition of an inorganic filler such as carbon black or titanium oxide and a flame retardant other than a platinum-based compound.

A flame-retardant polyorganosiloxane composition of the present invention comprises:

(A) a straight-chain polyorganosiloxane having two or more alkenyl groups bonded to silicon atoms on average in one molecule and having a viscosity at 25° C. of 10,000 to 1,000,000 mPa·s;

(B) 30 to 80 mass % of a polyorganosiloxane relative to a total of the (A) component and this component, the polyorganosiloxane having a resin structure which includes a tetrafunctional siloxane unit represented by a formula: $SiO_{4/2}$, has one or more substituted or unsubstituted alkyl groups bonded to silicon atoms in one molecule and "0" (zero) or more alkoxy groups bonded to silicon atoms in one molecule, and has 1.5 or more alkenyl groups bonded to silicon atoms on average in one molecule and in which a molar ratio (a number of moles of alkoxy groups/a number of moles of substituted or unsubstituted alkyl groups) of the alkoxy groups to the substituted or unsubstituted alkyl groups is 0.030 or less;

(C) an amount of a polyorganohydrogensiloxane which has hydrogen atoms bonded to silicon atoms, whose average degree of polymerization is 10 or more, and in which a content of the hydrogen atoms is 5.0 mmol/g or more, in which the hydrogen atoms in the component are 1.0 to 3.0 mol relative to a total of 1 mol of the alkenyl groups in the (A) component and the alkenyl groups in the (B) component; and (D) a catalyst amount of a hydrosilylation reaction catalyst.

A flame-retardant cured product of the present invention is made by curing the flame-retardant polyorganosiloxane composition of the present invention, wherein evaluation of flame retardancy of a test piece with a thickness of 10 mm or less in conformity to UL-94 is V-1 or V-"0" (zero).

Further, a flame-retardant cured product of the present invention is made by curing the flame-retardant polyorganosiloxane composition of the present invention, wherein evaluation of flame retardancy of a test piece with a thickness of 10 mm or less in conformity to UL-94 is 5VB or 5VA.

An optical member and a light source lens or cover of the present invention is made by curing the flame-retardant polyorganosiloxane composition of the present invention.

A molding method of the present invention includes molding by a method selected from injection molding, compression molding, transfer molding, potting, and dispensing using the flame-retardant polyorganosiloxane composition of the present invention.

Note that in the following description, "alkenyl group bonded to silicon atom" is sometimes indicated simply as "alkenyl group". Further, "hydrogen atom bonded to silicon atom" is sometimes indicated as "Si—H".

According to a flame-retardant polyorganosiloxane composition of the present invention, it is possible to obtain a cured product having sufficient rubber hardness and having excellent flame retardancy. Further, mechanical strength, elongation, and the like of the cured product are also good. Further, coloring and discoloration (yellowing) of the cured product are suppressed, so that transparency is good. Moreover, because a compounding amount of a platinum-based metal compound can be reduced, high flame retardancy can be achieved without causing an increase in a material cost.

DETAILED DESCRIPTION

Hereinafter, embodiments of the present invention will be described.

[Flame-Retardant Polyorganosiloxane Composition]

A flame-retardant polyorganosiloxane composition of an embodiment of the present invention includes (A) a straight-chain polyorganosiloxane which has two or more alkenyl groups on average in one molecule and whose viscosity at 25° C. is 10,000 to 1,000,000 mPa·s, (B) a polyorganosiloxane having a resin structure which contains a tetrafunctional siloxane unit and has 1.5 or more alkenyl groups on average in one molecule and in which a molar ratio of alkoxy groups to substituted or unsubstituted alkyl groups is 0.030 or less, (C) a polyorganohydrogensiloxane whose average degree of polymerization is 10 or more and in which a content of hydrogen atoms bonded to silicon atoms is 5.0 mmol/g or more, and (D) a hydrosilylation reaction catalyst.

Hereinafter, each component of (A) to (D) will be described.

<(A) Component>

The (A) component is a component which becomes a base polymer of the flame-retardant polyorganosiloxane composition of the present invention together with the later-described (B) component. The (A) component is a polyorganosiloxane which has two or more alkenyl groups on average in one molecule and whose viscosity at 25° C. is 10,000 to 1,000,000 mPa·s (10 to 1,000 Pa·s).

A molecular structure of the (A) component has a straight-chain structure in which a main chain is formed basically by repetition of diorganosiloxane units and both terminals of a molecular chain are blocked with triorganosiloxy groups.

Examples of an alkenyl group bonded to a silicon atom in the (A) component include the ones having a number of carbon atoms of 2 to 8, more preferably 2 to 4, such as a vinyl group, an allyl group, a butenyl group, a pentenyl group, a hexenyl group, and a heptenyl group. In particular, the vinyl group is preferable. The alkenyl group may be bonded to either silicon atom of the terminal and the middle of a molecular chain, or the alkenyl groups may be bonded to both silicon atoms of the terminal and the middle of the molecular chain.

An example of an organic group bonded to a silicon atom other than the alkenyl group in the (A) component is an unsubstituted or substituted monovalent hydrocarbon group. Examples of the unsubstituted monovalent hydrocarbon group include: alkyl groups having a number of carbon atoms of 1 to 1, such as a methyl group, an ethyl group, a propyl group, a butyl group, a pentyl group, a hexyl group, a cyclohexyl group, and a heptyl group; aryl groups having a number of carbon atoms of 6 to 14, such as a phenyl group, a tolyl group, a xylyl group, and a naphthyl group; and aralkyl groups such as a benzyl group and a phenethyl group. Besides, examples of the substituted monovalent hydrocarbon group include halogenated alkyl groups such as a chloromethyl group, a 3-chloropropyl group, and a 3,3,3-trifluoropropyl group. As the organic group other than the alkenyl group, the methyl group or the phenyl group is preferable.

The viscosity at 25° C. of the (A) component (hereinafter, simply referred to as a viscosity) is 10,000 to 1,000,000 mPa·s. The viscosity of the (A) component is preferably 10,000 to 700,000 mPa·s, more preferably 50,000 to 500,000 mPa·s, and particularly preferably 60,000 to 200,000 mPa·s. When the viscosity of the (A) component is 10,000 to 1,000,000 mPa·s, workability of the composition is excellent and, preferably, physical properties of a cured product of this composition are also excellent.

Concrete examples of the (A) component include both ends trimethylsiloxy group-terminated dimethylsiloxane/methylvinylsiloxane copolymer, both ends dimethylvinylsiloxy group-terminated dimethylsiloxane/methylphenylsiloxane copolymer, both ends dimethylvinylsiloxy group-terminated dimethylpolysiloxane, both ends dimethylvinylsiloxy group-terminated dimethylsiloxane/methylvinylsiloxane copolymer, both ends dimethylvinylsiloxy group-terminated dimethylsiloxane/methylvinylsiloxane/methylphenylsiloxane terpolymer, both ends trivinylsiloxy group-terminated dimethylpolysiloxane, both ends dimethylvinylsiloxy group-terminated dimethylsiloxane/diphenylsiloxane copolymer, and the like.

One kind of the polymers, copolymers and terpolymer can be used independently, or two or more kinds of them can be used in combination. In the case of using, among them, a straight-chain polyorganosiloxane in which all of organic groups other than the alkenyl groups bonded to silicon atoms are methyl groups, namely, both ends trimethylsiloxy group-terminated dimethylsiloxane/methylvinylsiloxane copolymer, both ends dimethylvinylsiloxy group-terminated dimethylpolysiloxane, both ends dimethylvinylsiloxy group-terminated dimethylsiloxane/methylvinylsiloxane copolymer, or both ends trivinylsiloxy group-terminated dimethylpolysiloxane, a cured product excellent in mechanical properties can be obtained. In particular, when the (A) component is comprised of the straight-chain polyorganosiloxane in which all the organic groups other than the alkenyl groups are the methyl groups and does not contain a polyorganosiloxane having phenyl groups, a cured product excellent in tensile strength, elongation, and the like can be obtained.

Further, the (A) component can include a polyorganosiloxane represented by the following formula (1) as at least a part.

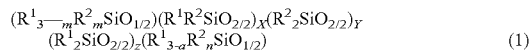

(1)

In the formula (1), each $R^1$ is independently an alkenyl group or a substituted or unsubstituted alkyl group, and at least two of a plurality of $R^1$ s are alkenyl groups. Examples of the alkenyl group include the ones having a number of carbon atoms of 2 to 8, more preferably 2 to 4, such as a vinyl group, an allyl group, a butenyl group, a pentenyl group, a hexenyl group, and a heptenyl group. In particular, the vinyl group is preferable. The alkenyl group may be bonded to either silicon atom of the terminal and the middle of a molecular chain, or the alkenyl groups may be bonded to both silicon atoms of the terminal and the middle of the molecular chain. In terms of imparting moderate elongation to a cured product, a structure in which the alkenyl groups are bonded to only silicon atoms of both the terminals of the molecular chain is preferable.

Examples of the unsubstituted monovalent hydrocarbon group include alkyl groups having a number of carbon atoms of 1 to 10, such as a methyl group, an ethyl group, a propyl group, a butyl group, a pentyl group, a hexyl group, a cyclohexyl group, and a heptyl group. Examples of the substituted monovalent hydrocarbon group include halogenated alkyl groups such as a chloromethyl group, a 3-chloropropyl group, and a 3,3,3-trifluoropropyl group. As the substituted or unsubstituted alkyl group, the methyl group is preferable.

In the above-described formula (1), $R^2$ is a phenyl group. m is "0" (zero) or 1 and n is "0" (zero) or 1. m and n may be the same number or different numbers but are preferably the same from the viewpoint of ease of manufacture.

Further, X and Y are "0" (zero) or a positive integer and Z is a positive integer, and a relationship of $0.02 \leq (X+Y)/(X+Y+Z) \leq 0.10$ is established. Here, (X+Y+Z) represents the number of bifunctional siloxane units at the middle of a molecular chain. In a straight-chain polyorganosiloxane represented by the formula (1), an average degree of polymerization is (X+Y+Z+2). (X+Y+Z+2) is adjusted so that the (A) component has the above-described viscosity (10,000 to 1,000,000 mPa·s). (X+Y+Z+2) is specifically preferably 300 or more to 1300 or less.

In the straight-chain polyorganosiloxane, (X+Y)/(X+Y+Z) indicates a rate of units having phenyl groups to all the bifunctional units. When (X+Y)/(X+Y+Z) is 0.02 or more, the composition excellent in flame retardancy and a light transmitting property can be obtained. Further, when (X+Y)/(X+Y+Z) is 0.10 or less, a viscosity rise in an uncured product and a decrease in mechanical strength of a cured product do not occur.

Further, due to ease (namely, even though the number of phenyl group-containing units is small, more phenyl groups can be introduced.) of a preparation of the straight-chain polyorganosiloxane and good flame retardancy of a cured product, X is preferably "0" (zero). That is, the polyorganosiloxane contained in the (A) component is preferably a straight-chain polyorganosiloxane represented by a formula: $R^1_3SiO_{1/2}(R^2_2SiO_{2/2})_Y(R^1_2SiO_{2/2})_Z(R^1_3SiO_{1/2})$. In this case, because the flame retardancy and the light transmitting property of a cured product are good and the viscosity rise in an uncured product and the like are prevented, it is preferable to be $0.02 \leq Y/(Y+Z) \leq 0.06$.

<(B) Component>

The (B) component is a polyorganosiloxane having a resin structure (three-dimensional network structure) which contains a tetrafunctional siloxane unit (hereinafter, which are referred to as Q unit.) represented by a formula: $SiO_{4/2}$ and has 1.5 or more alkenyl groups on average in one molecule. Further, this polyorganosiloxane (hereinafter, which is referred to as a resinoid polyorganosiloxane.) having a resin structure has one or more substituted or unsubstituted alkyl groups bonded to silicon atoms in one molecule and has "0" (zero) or more alkoxy groups bonded to silicon atoms in one molecule, and a molar ratio (the number of moles of alkoxy groups/the number of moles of substituted or unsubstituted alkyl groups, hereinafter, which is also referred to as alkoxy groups/alkyl groups.) of the alkoxy groups to the substituted or unsubstituted alkyl groups is 0.030 or less.

Note that the resinoid polyorganosiloxane being the (B) component also includes a polyorganosiloxane in which an alkoxy group bonded to a silicon atom in one molecule is "0" (zero) and a value of alkoxy groups/alkyl groups is "0" (zero).

By using the resinoid polyorganosiloxane which has 1.5 or more alkenyl groups on average in one molecule and in which alkoxy groups/alkyl groups is 0.030 or less, as the (B) component, a composition excellent in the flame retardancy can be obtained. When the number of alkenyl groups (in one molecule) of a resinoid polyorganosiloxane is less than 1.5 on average, or when alkoxy groups/alkenyl groups exceeds 0.030, the flame retardancy of an obtained composition becomes poor, for example, a composition in which evaluation of flame retardancy of a cured product in conformity to UL-94 is V-1 and V-"0" (zero) or 5VB and 5BA cannot be obtained.

A more preferable range of the number of alkenyl groups is two or more on average in one molecule, and 2.3 or more on average is particularly preferable.

Further, a preferable value of alkoxy groups/alkyl groups is 0.020 or less. When a resinoid polyorganosiloxane in which alkoxy groups/alkyl groups is 0.020 or less is used, regardless of structures of the above-described (A) component and the later-described (C) component, namely, even though all hydrocarbon groups other than alkenyl groups which the (A) component has are substituted or unsubstituted alkyl groups and do not have a phenyl group, or even though the (C) component is a straight-chain one, the composition excellent in the flame retardancy can be obtained.

In a case where a resinoid polyorganosiloxane in which alkoxy groups/alkyl groups is more than 0.020 to 0.030 or less is used as the (B) component, when a straight-chain polyorganosiloxane having no phenyl group is used as the (A) component and a straight-chain hydrogenpolysiloxane is used as the (C) component, sufficient flame retardancy cannot be obtained. In a case where the resinoid polyorganosiloxane in which alkoxy groups/alkyl groups is more than 0.020 to 0.030 or less is used and the straight-chain polyorganosiloxane having no phenyl group is used as the (A) component, only when the later-described hydrogenpolysiloxane having a three-dimensional network structure (resinoid structure) is used as the (C) component, a composition excellent in the flame retardancy can be obtained.

Note that in a case where the polyorganosiloxane having phenyl groups is used as the (A) component, even though the resinoid polyorganosiloxane in which alkoxy groups/alkyl groups is more than 0.020 to 0.030 or less is used as the (B) component and the straight-chain one is used as the (C) component, a composition excellent in the flame retardancy can be obtained.

Alkoxy groups/alkyl groups of the resinoid polyorganosiloxane being the (B) component is particularly preferably 0.015 or less.

Alkoxy groups/alkyl groups in the resinoid polyorganosiloxane can be easily found by measuring a content (number of moles) of the alkoxy groups and the alkyl groups by nuclear magnetic resonance spectroscopy (NMR) or the like.

As the resinoid polyorganosiloxane being the (B) component, it is preferable to use a polyorganosiloxane having a three-dimensional network structure, which includes a monofunctional siloxane unit represented by a formula: $R^1_3SiO_{1/2}$, a bifunctional siloxane unit represented by a formula: $R^1_2SiO_{2/2}$, and a tetrafunctional siloxane unit (Q unit) represented by a formula: $SiO_{4/2}$ at a molar ratio of monofunctional siloxane unit:bifunctional siloxane unit:Q unit=a:b:c on average, and has 1.5 or more alkenyl groups on average in one molecule. This polyorganosiloxane can be represented by an average unit formula: $(R^1_3SiO_{1/2})_a(R^1_2SiO_{2/2})_b(SiO_{4/2})_c(OR^0)_p$.

In the above-described unit formula, $R^1$ is the same as that in the above-described formula (1). That is, each $R^1$ is independently an alkenyl group or a substituted or unsubstituted alkyl group. Among a plurality of $R^1$s existing in one molecule of a resinoid polyorganosiloxane, the alkenyl groups are 1.5 on average. As the alkenyl group, there can be cited a vinyl group, an allyl group, a butenyl group, a pentenyl group, a hexenyl group, a heptenyl group, or the like. The vinyl group is preferable. As the unsubstituted alkyl group, there can be cited a methyl group, an ethyl group, a propyl group, a butyl group, a pentyl group, a hexyl group, a heptyl group, or the like. As the substituted alkyl group, there can be cited a halogen-substituted alkyl group in which a hydrogen atom is substituted for a halogen atom, such as a chloromethyl group, a 3-chloropropyl group, or a 3,3,3-trifluoropropyl group. As the substituted or unsubstituted alkyl group, the methyl group is preferable.

Further, $R^0$ is an unsubstituted alkyl group. When the polyorganosiloxane (B) has $(OR^0)$, as the unsubstituted alkyl group, a methyl group or an ethyl group is preferable.

a, b, and c are positive numbers satisfying a relationship of $0.3 \le a \le 0.6$, "0" (zero)$\le b \le 0.1$, $0.4 \le c \le 0.7$ and $a+b+c=1$. A more preferable range of a, b, and c is $0.35 \le a \le 0.55$, "0" (zero)$\le b \le 0.05$, and $0.45 \le c \le 0.65$.

p in the average unit formula is a positive number in which a molar ratio (the number of moles of alkoxy groups/ the number of moles of substituted or unsubstituted alkyl groups, hereinafter, which is also indicated as alkoxy groups/alkyl groups.) of the alkoxy groups to the substituted or unsubstituted alkyl groups is 0.030 or less, more preferably 0.020 or less.

As the resinoid polyorganosiloxane being the (B) component, a copolymer constituted of a monofunctional siloxane unit (hereinafter, which is also referred to as $R^4_3SiO_{1/2}$ unit.) represented by a formula: $R^4_3SiO_{1/2}$ ($R^4$ is an unsubstituted alkyl group, and a plurality of $R^4$s may be different from each other. hereinafter the same.), a monofunctional siloxane unit (hereinafter, which is also referred to as $R^4_2R^5SiO_{1/2}$ unit.) represented by a formula: $R^4_2R^5SiO_{1/2}$ ($R^5$ is an alkenyl group. hereinafter the same.), a bifunctional siloxane unit (hereinafter, which is also referred to as $R^4_2SiO_{2/2}$ unit.) represented by a formula: $R^4_2SiO_{2/2}$, and a tetrafunctional siloxane unit (Q units) represented by a formula: $SiO_{4/2}$, a copolymer constituted of $R^4_3SiO_{1/2}$ unit, $R^4_2R^5SiO_{1/2}$ unit, and Q unit, a copolymer constituted of $R^4_2R^5SiO_{1/2}$ unit, $R^4_2SiO_{2/2}$ unit, and Q unit, or the like can be cited. One type of these copolymers can be used alone or two or more types of them can be used in combination.

Among the above-described copolymers, in the siloxane units, the copolymer constituted of $R^4_3SiO_{1/2}$ unit, $R^4_2R^5SiO_{1/2}$ unit, and Q unit is preferable. From the viewpoint of the flame retardancy and the like, $(OR^0)$ groups which a copolymer has are preferably as small as possible, and a copolymer having no $(OR^0)$ group is particularly preferable.

More specifically, in the siloxane units, a copolymer constituted of monofunctional siloxane units (hereinafter, which are indicated as $M^{vi}$ units.) represented by a formula: $(CH_3)_2(CH_2=CH)SiO_{1/2}$, monofunctional siloxane units (hereinafter, which are indicated as M units.) represented by a formula: $(CH_3)_3SiO_{1/2}$, and tetrafunctional siloxane units (Q units) represented by a formula: $SiO_{4/2}$ is preferable. Further, a copolymer constituted of only such siloxane units and having no alkoxy group is particularly preferable.

In general, a resinoid polyorganosiloxane can be obtained by adding water to chlorosilane and alkoxysilane and hydrolyzing them. In order to obtain the (B) resinoid polyorganosiloxane to be compounded in a composition of the present invention, it is necessary to cause a hydrolysis reaction while adjusting a content rate of alkoxy groups (methoxy groups, ethoxy groups, or the like) below a certain level. A method of adjusting the content rate of the alkoxy groups below a certain level is not particularly limited, and examples of the method include controlling the reaction temperature, time or the like of the hydrolysis, performing extraction and removal using a water-soluble solvent such as alcohol, and the like. The resinoid polyorganosiloxane having a low content rate of the alkoxy groups and having alkoxy groups/alkyl groups of 0.030 or less can be obtained, for example, by performing the following steps (1) to (3) in sequence.

(1) A step of hydrolyzing at least three kinds selected from silicon compounds represented by formulas: $R^1_3SiW$, $R^1_2SiW_2$, $SiW_4$, with a mixed solution of acetone and water.

(2) A step of removing acid and acetone by water washing after the above-described (1) step.

(3) A step of adding alkali and performing heating after the above-described (2) step.

In the silicon compounds to be used as a starting material in the above-described (1) step, each $R^1$ is independently an alkenyl group or a substituted or unsubstituted alkyl group, and the same groups as those of the above-described formula (1) can be cited. Further, each W is independently a chlorine atom, an alkoxy group, or a hydroxyl group. As such silicon compounds, there can be cited tetraethoxysilane, chlorodimethylvinylsilane, chlorotrimethylsilane, dichlorodimethylsilane, and the like. Then, three or more kinds are selected from among those silicon compounds and used.

Note that as at least one kind of the three kinds of silicon compounds used as the starting materials, a silicon compound having one or more alkenyl groups as $R^1$s is used. Further, it is preferable to use, as at least one kind of silicon compound, a silicon compound having one or more chlorine atoms as Ws.

The mixing ratio between acetone and water is preferably in a range of acetone:water of 1:1 to 1:4 (mass ratio). The hydrolysis can be performed by a well known method. Further, in the (2) step, the water washing method is not particularly limited, and a well known method can be used.

In the (3) step, examples of the alkali to be added to the solution obtained in the (2) step include potassium hydroxide, cesium hydroxide and the like. Then, such alkali is added by a well known method and heating and dehydration are performed, and then neutralization is performed using a phosphoric acid or the like to obtain the resinoid polyorganosiloxane.

A preferable weight-average molecular weight Mw of the resinoid polyorganosiloxane (B) is 1,500 to 10,000, and is more preferably in a range of 2,200 to 8,000. Note that Mw is a value converted into polystyrene by gel permeation chromatography (hereinafter, described as GPC). When the Mw of the resinoid polyorganosiloxane is less than 1,500, sufficient mechanical strength cannot be stably obtained, whereas when it is more than 10,000, the viscosity of this composition increases to lose flowability and deteriorate in molding property.

The resinoid polyorganosiloxane being the (B) component is a polymer component of the composition of the present invention together with the straight-chain polyorganosiloxane being the (A) component. The compounding ratio between the (B) resinoid polyorganosiloxane and the (A) straight-chain polyorganosiloxane is preferably such a ratio that the (B) component is 30 to 80 mass % and the (A) component is 70 to 20 mass % to the total (100 mass %) of the (A) component and the (B) component. When the compounding rate of the (B) component is less than 30 mass %, a composition good in the flame retardancy cannot be obtained. When the compounding rate of the (B) component is more than 80 mass %, the viscosity of the composition may be high to deteriorate in workability. The compounding rate of the (B) component is more preferably 35 to 70 mass %, and particularly preferably 37 to 65 mass %.

<(C) Component>

The (C) component is a polyorganohydrogensiloxane having one or more hydrogen atom bonded to silicon atom (Si-bonded hydrogen atom), an average degree of polymerization of 10 or more, and a content of Si-bonded hydrogen atom of 5.0 mmol/g or more. The polyorganohydrogensiloxane being the (C) component acts as a crosslinking agent by reaction of its Si-bonded hydrogen atom with the alkenyl group in the (A) component or the (B) component. The molecular structure of the (C) component is not particularly limited, and, for example, various kinds of polyorganohydrogensiloxanes having straight-chain, cyclic, branched, three-dimensional network shapes can be used. One kind of them can be used independently, or two or more kinds of them can be used in combination.

From the viewpoint of easy control of a viscosity and a Si—H amount, the (C) component is preferably a straight-chain polyorganohydrogensiloxane. Further, the one having a three-dimensional network structure is preferably used as the (C) component because high crosslink density is imparted to a cured product, thereby high hardness is imparted to the cured product. Moreover, the polyorganohydrogensiloxane having a three-dimensional network structure is more effective in the flame retardancy compared with the straight-chain polyorganohydrogensiloxane.

In the polyorganohydrogensiloxane being the (C) component, the average degree of polymerization corresponds to the number of silicon atoms in one molecule, and is also the number of siloxane units existing in one molecule. The average degree of polymerization of the (C) component is 10 or more. The average degree of polymerization is preferably 10 to 250, and more preferably 30 to 200. Further, the content of Si—H per unit mass of the (C) component is 5.0 mmol/g or more. The content of Si—H preferably falls within a range of 5.5 to 13.0 mmol/g.

When the polyorganohydrogensiloxane being the (C) component is straight-chain, Si—H may be located at only either of the terminal and the middle of a molecular chain or located at both of them. In terms of moderately adjusting hardness of a cured product, a straight-chain polyorganohydrogensiloxane having Si—H at the middle of the molecular chain is preferable.

More specifically, the straight-chain polyorganohydrogensiloxane of the (C) component is preferably a straight-chain polyorganohydrogensiloxane represented by a molecular formula: $(R^3{}_3SiO_{1/2})(R^3HSiO_{2/2})_x(R^3{}_2SiO_{2/2})_y(R^3{}_3SiO_{1/2})$, or a molecular formula: $(R^3{}_2HSiO_{1/2})(R^3HSiO_{2/2})_x(R^3{}_2SiO_{2/2})_y(R^3{}_2HSiO_{1/2})$.

Here, each $R^3$ is independently a substituted or unsubstituted monovalent hydrocarbon group except an alkenyl group. Examples of $R^3$ include: an alkyl group having a number of carbon atoms of 1 to 10, such as a methyl group, an ethyl group, a propyl group, a butyl group, a pentyl group, a hexyl group, a cyclohexyl group, and a heptyl group; an aryl group having a number of carbon atoms of 6 to 14, such as a phenyl group, a tolyl group, a xylyl group, and a naphthyl group; an aralkyl group such as a benzyl group and a phenethyl group; and a halogenated alkyl group such as a chloromethyl group, a 3-chloropropyl group, and a 3,3,3-trifluoropropyl group. As $R^3$, the methyl group or the phenyl group is preferable.

In the above formulas, both x and y are positive integer numbers, and a relation of $8 \le x+y \le 300$ and $0.4 \le x/(x+y) \le 0.8$ is satisfied. Here, (x+y) represents the number of siloxane units at the middle of the molecular chain. In the polyorganohydrogensiloxane, the average degree of polymerization being the number of silicon atoms in one molecule is (x+y+2). A preferable range of (x+y) is 30 or more and 200 or less.

Further, a polyorganohydrogensiloxane having a three-dimensional network structure (resinoid) which has $R^5{}_2HSiO_{1/2}$ units (each R5 is independently a substituted or unsubstituted monovalent hydrocarbon group except an alkenyl group. Specifically, the above is described.) and Q units can be used as the (C) component, in terms of imparting high hardness to a cured product while having tractable proper viscosity.

As the above-described polyorganohydrogensiloxane having the three-dimensional network structure, more specifically, a polyorganohydrogensiloxane including at least $(CH_3)_2HSiO_{1/2}$ unit (hereinafter, which is indicated as $M^H$ unit.) and $SiO_{4/2}$ unit (Q unit) can be cited. This polyorganohydrogensiloxane can further include $(CH_3)_3SiO_{1/2}$ unit (hereinafter, which is indicated as M unit.) and/or $CH_3SiO_{3/2}$ unit (hereinafter, which is indicated as T unit.).

In a ratio of $M^H$ unit to Q unit, the $M^H$ unit preferably has a ratio of 1.5 to 2.2 mol, further preferably 1.8 to 2.1 mol relative to 1 mol of the Q unit. Typically, a polymethylhydrogensiloxane having a structure in which the four to five Q units and the $M^H$ units and/or M units (however, at least three $M^H$ units in a molecule) are bonded to each other as represented by a formula: $[(CH_3)_2HSiO_{1/2}]_8[SiO_{4/2}]_4$ or a formula: $[(CH_3)_2HSiO_{1/2}]_{10}[SiO_{4/2}]_5$ is particularly preferable.

A compounding amount of this straight-chain polyorganohydrogensiloxane or polyorganohydrogensiloxane having a three-dimensional network structure which is the (C) component is an effective amount of curing of the above-described (A) component and (B) component. Relative to a total of 1 mol of the alkenyl groups in the (A) component and the alkenyl groups in the (B) component, an amount in which Si—H in the (C) component is 1.0 to 3.0 mol is set. A range of 1.5 to 2.5 mol is preferable. A curing reaction does not progress when Si—H is less than 1.0 mol, thereby it may be difficult to obtain a cured product, and much unreacted Si—H remains in a cured product when Si—H exceeds 3.0 mol, thereby causing a possibility that physical properties of the cured product change with time.

<(D) Component>

The hydrosilylation reaction catalyst being the (D) component is a catalyst that promotes an addition reaction (hydrosilylation reaction) between the alkenyl group in the (A) component and the (B) component and the Si-bonded hydrogen atom in the (C) component. The hydrosilylation reaction catalyst is not particularly limited as long as it promotes the hydrosilylation reaction. A platinum-based metal compound is preferable, and a metallic catalyst such as palladium, rhodium, cobalt, nickel, ruthenium, iron or the like can also be used. The platinum-based metal compound has a function of improving the flame retardancy of a composition.

As the platinum-based metal compound, for example, a chloroplatinic acid, an alcohol solution of the chloroplatinic acid, a platinum complex having olefines, a vinyl group-containing siloxane, or an acetylene compound as a ligand or the like can be used.

The compounding amount of the (D) platinum-based metal compound is such an amount that its content rate to the whole composition is 0.5 to 10 mass ppm when converted into a platinum element. It is more preferably 1 to 5 mass ppm, and furthermore preferably 1 to 2.5 mass ppm. When the compounding amount of the platinum-based metal compound is less than 0.5 mass ppm, curability decreases remarkably, and when it exceeds 10 mass ppm, transparency of a cured product decreases. When it falls within this range, a cured product excellent in the flame retardancy and good in the physical properties can be obtained and there is also an economical advantage.

<(E) Flame Retardant>

In the flame-retardant polyorganosiloxane composition of the present invention, (E) a flame retardant other than the above-described (D) platinum-based metal compound is further compounded, thereby allowing the flame retardancy to be further improved. As such (E) a flame retardant, there can be cited phosphite represented by triphenylphosphite, trilaurylphosphite, trilauryltrithiophosphite, trisnonylphenylphosphite, and dibutylphosphite, phosphoric acid esters represented by trimethylphosphate, triethylphosphate, tributylphosphate, trioctylphosphate, trichloroethylphosphate, and triphenylphosphate, or the like. One kind or two or more kinds of these compounds can be added.

When (E) the flame retardant is contained, a content thereof is preferably 1 to 70 mass ppm relative to the whole of a composition. As long as it falls within this range, the flame retardancy of the composition can be further improved without decreasing the curability.

The flame-retardant polyorganosiloxane composition of the present invention is prepared by uniformly mixing the above-described components, and its curability can be arbitrarily adjusted by addition of a reaction inhibitor. Examples of the inhibitor for the curing reaction include acetylene alcohols such as 3-methyl-1-butyne-3-ol, 2-phenyl-3-butyne-2-ol, and 1-ethynylcyclohexanol, and a maleic acid derivative such as maleic acid diallyl.

Further, the polyorganosiloxane composition for molding can also be stored while divided in two liquids to prevent curing from proceeding, and the two liquids can be mixed together in use for curing. For the two-liquid-mixing type, it is necessary to avoid storage of the polyorganohydrogensiloxane (C) and the platinum-based metal compound (D) in the same wrapper in terms of the risk of a dehydrogenation reaction.

A viscosity of the obtained flame-retardant polyorganosiloxane composition of the present invention is preferably in a range of 5,000 to 1,000,000 mPa·s, particularly preferably in a range of 10,000 to 500,000 mPa·s as a value measured by a rotational viscometer at 25° C.

The flame-retardant polyorganosiloxane composition of the present invention preferably contains no inorganic filler. Even composition containing no inorganic filler makes it possible to obtain a cured product having sufficient rubber hardness and having excellent flame retardancy. Further the mechanical properties (strength, elongation, and the like) of the cured product are also good. When the flame-retardant polyorganosiloxane composition containing no inorganic filler is used, a cured product having high transmittance of light (for example, visible light) can be obtained.

The flame-retardant polyorganosiloxane composition of the present invention is cured by being heated as necessary. A curing condition is not particularly limited, but the composition is cured by being held normally at temperatures of 40 to 200° C., preferably 80 to 180° C. for about 0.5 minute to 10 hours, preferably for about 1 minute to 6 hours.

[Flame-Retardant Cured Product]

A flame-retardant cured product of the embodiment of the present invention is made by curing the above-described flame-retardant polyorganosiloxane composition. This cured product is excellent in the flame retardancy. Specifically, judgment of the flame retardancy of a test piece with a thickness of 10 mm or less in conformity to a UL-94 combustion test is V-1 or V-"0" (zero).

Further, this flame-retardant cured product has the sufficient rubber hardness, is excellent in the mechanical properties (strength and elongation), and is good in weather resistance. Further, it does not easily discolor (yellow) with time.

Moreover, when the flame-retardant polyorganosiloxane composition containing no inorganic filler is used, this cured product has a transmittance of 85% or more to light with a wavelength of 400 nm in a thickness of 6 mm, which is high light transmittance.

Note that molding of the flame-retardant polyorganosiloxane composition can be performed by a method of being selected from injection molding, compression molding, transfer molding, potting, and dispensing, and the injection molding is particularly preferable.

The flame-retardant cured product of the embodiment of the present invention is excellent in the above-described properties, thereby allowing use as an optical member and a light source lens or cover and in particular, being suitable for an optical member such as a sealing material of a light-emitting element in a light-emitting device such as an LED device and a material of a functional lens.

In particular, the flame-retardant cured product formed by molding and curing the above-described flame-retardant polyorganosiloxane composition is excellent in the flame retardancy, is good in the mechanical properties and the weather resistance, does not easily discolor (yellow), and has the high transmittance of light such as visible light, thereby allowing suitable use as a lens and cover of various outdoor light sources and an automobile light source.

Examples of the optical member, light source lens or cover made by curing the polyorganosiloxane composition for molding of the present invention include a primary or secondary LED lens, a thick optical lens, an LED reflector, an automobile LED matrix lighting lens, an augmented reality optical member, a silicone optical head for an LED chip, a work light lens and reflector, an illumination optical member for smartphone or tablet, an LED display and a light guide for computer or television, and the like. Further, examples of the light source in the light source lens or cover include indoor or outdoor lighting, a reading light and accent lighting of public transport, an LED street light and the like.

EXAMPLES

Hereinafter, the present invention will be specifically described citing examples, but the present invention is not limited to these examples.

In the following description, an M unit, an $M^{vi}$ unit, an $M^H$ unit, a D unit, a $D^H$ unit, a $D^{ph}$ unit, and a Q unit represent siloxane units represented by the following formulas, respectively, and an OE unit represents an organic unit represented by the following formula.

| M unit | $(CH_3)_3SiO_{1/2}$ |
|---|---|
| $M^{vi}$ unit | $(CH_3)_2(CH_2\!=\!CH)SiO_{1/2}$ |
| $M^H$ unit | $(CH_3)_2HSiO_{1/2}$ |
| D unit | $(CH_3)_2SiO_{2/2}$ |
| $D^H$ unit | $(CH_3)HSiO_{2/2}$ |
| $D^{ph}$ unit | $(C_6H_5)_2SiO_{2/2}$ |
| Q unit | $SiO_{4/2}$ |
| OE unit | $CH_3CH_2O_{1/2}$ |

The viscosity is a measured value at 25° C. unless otherwise stated. Besides, the weight-average molecular weight (Mw) is a value obtained by measurement using a gel permeation chromatography (GPC) apparatus (manufactured by Shimadzu Corporation, apparatus name; Prominence GPC system, column; Shim-pack GPC-80M) using toluene as a solvent, and converted into polystyrene. Further, the nonvolatile content (mass %) is a value obtained by measurement under heating conditions of 150° C.×1 hour.

Synthesis Example 1

Synthesis of a Resinoid Vinyl Group-Containing Methylpolysiloxane B1

970 g (4.66 mol) of tetraethoxysilane, 42 g (0.35 mol) of chlorodimethylvinylsilane, 357 g (3.29 mol) of chlorotrimethylsilane, and 400 g of xylene were put into and stirred in a flask, and 900 g of a mixed solution of 600 g of water and 300 g of acetone was dropped thereinto. Stirring was performed at 70 to 80° C. for 1 hour and hydrolysis was performed, and then liquid separation was performed to obtain a xylene solution. Subsequently, 500 g of water was added to the obtained xylene solution, and water washing and liquid separation were performed to extract acetone in the xylene solution into the water. Then, the operation of water washing and liquid separation was repeated until the water used for the washing exhibited neutrality.

Next, 200 g of xylene and 0.18 g of potassium hydroxide were added to the obtained xylene solution, and stirring was performed while heating. After heating up to 140° C. and dehydration, reflux was performed at 140° C. for 3 hours. After cooling, neutralization was performed using a phosphoric acid to adjust so that the nonvolatile content was 50 mass %, thereby obtaining a vinyl group-containing methylpolysiloxane B1.

In the obtained vinyl group-containing methylpolysiloxane B1, a ratio between the number of hydrogen atoms derived from $CH_2$ groups in ethoxy groups and the number of hydrogen atoms derived from $CH_3$ groups bonded to silicon atoms (the number of hydrogen atoms derived from $CH_2$ groups/the number of hydrogen atoms derived from Si—$CH_3$ groups) was 0.0089 when obtained by $^1$H-NMR. This shows that the molar ratio of the alkoxy groups (ethoxy groups) to the methyl groups bonded to the silicon atoms (Si—$CH_3$ groups) (hereinafter, referred to as OR/SiMe) in B1 was 0.013.

Further, it is found from the charged amounts of the starting materials and the result of $^1$H-NMR that the obtained vinyl group-containing methylpolysiloxane B1 has the $M^{vi}$ unit, the M unit, the Q unit, and the OE unit, and the molar ratio among the units is $M^{vi}$ unit:M unit:Q unit:OE unit=0.042:0.396:0.562:0.017. The Mw of B1 measured by GPC was 3400. Besides, an average unit formula of B1 obtained from the above-described molar ratio and Mw was $M^{vi}{}_{2.0}M_{19.1}Q_{27.2}(OE)_{0.82}$ and the number of alkenyl groups bonded to silicon atoms in one molecule was 2.0 on average.

Synthesis Example 2

Synthesis of a Resinoid Vinyl Group-Containing Methylpolysiloxane B2

970 g (4.66 mol) of tetraethoxysilane, 70 g (0.58 mol) of chlorodimethylvinylsilane, 335 g (3.09 mol) of chlorotrimethylsilane, and 400 g of xylene were put into and stirred in a flask, and 600 g of water was dropped thereinto. Stirring was performed at 70 to 80° C. for 1 hour and hydrolysis was performed, and then liquid separation was performed to obtain a xylene solution. Subsequently, the obtained xylene solution was heated up to 130° C. and subjected to dehydration and dehydrochlorination. The above operation was continued until the xylene solution exhibited neutrality.

Next, 200 g of xylene and 0.18 g of potassium hydroxide were added to the obtained xylene solution, and stirring was performed while heating. After heating was performed up to 140° C., reflux was performed at 140° C. for 3 hours. After cooling, neutralization was performed using a phosphoric acid to adjust so that the nonvolatile content was 50 mass %, thereby obtaining a resinoid vinyl group-containing methylpolysiloxane B2.

In the obtained vinyl group-containing methylpolysiloxane B2, the number of hydrogen atoms derived from $CH_2$ groups/the number of hydrogen atoms derived from Si—$CH_3$ groups obtained by $^1$H-NMR was 0.0201. This shows that the OR/SiMe in B2 was 0.030.

Further, it is found from the charged amounts of the starting materials and the result of $^1$H-NMR that the vinyl group-containing methylpolysiloxane B2 has the $M^{vi}$ unit, the M unit, the Q unit, and the OE unit, and the molar ratio among the units is $M^{vi}$ unit:M unit:Q unit:OE unit=0.070: 0.371:0.559:0.038. The Mw of B2 by GPC was 1850. Besides, an average unit formula of B2 obtained from the above-described molar ratio and Mw was $M^{vi}{}_{1.8}M_{9.6}Q_{14.5}(OE)_{0.98}$ and the number of alkenyl groups bonded to silicon atoms in one molecule was 1.8 on average.

Synthesis Example 3

Synthesis of a Resinoid Vinyl Group-Containing Methylpolysiloxane B3

Xylene and potassium hydroxide were added to the xylene solution after liquid separation, heating up to 140° C.

and dehydration were performed, and then reflux was performed at 140° C. for 5 hours. Other than that, the same operation as in Synthesis Example 1 was performed to obtain a vinyl group-containing methylpolysiloxane B3.

In the obtained vinyl group-containing methylpolysiloxane B3, the number of hydrogen atoms derived from $CH_2$ groups/the number of hydrogen atoms derived from Si—$CH_3$ groups obtained by $^1$H-NMR was 0.0089. This shows that the OR/SiMe in B3 was 0.013.

Further, it is found from the charged amounts of the starting materials and the result of $^1$H-NMR that the vinyl group-containing methylpolysiloxane B3 has the $M^{vi}$ unit, the M unit, the Q unit, and the OE unit, and the molar ratio among the units is $M^{vi}$ unit:M unit:Q unit:OE unit=0.042:0.396:0.562:0.017. The Mw of B3 by GPC was 3740. Besides, an average unit formula of B3 obtained from the above-described molar ratio and Mw was $M^{vi}_{2.2}M_{21.1}Q_{29.9}(OE)_{0.90}$ and the number of alkenyl groups bonded to silicon atoms in one molecule was 2.2 on average.

Synthesis Example 4

Synthesis of a Resinoid Vinyl Group-Containing Methylpolysiloxane B4

970 g (4.66 mol) of tetraethoxysilane, 44 g (0.37 mol) of chlorodimethylvinylsilane, 359 g (3.31 mol) of chlorotrimethylsilane, and 400 g of xylene were put into and stirred in a flask, and 900 g of a mixed solution of 600 g of water and 300 g of acetone was dropped thereinto. Stirring was performed at 70 to 80° C. for 1 hour and hydrolysis was performed, and then liquid separation was performed to obtain a xylene solution. Next, 500 g of water was added to the obtained xylene solution, and water washing and liquid separation were performed to extract acetone in the xylene solution into the water. Then, the operation of water washing and liquid separation was repeated until the water used for the washing exhibited neutrality.

Subsequently, 200 g of xylene and 0.18 g of potassium hydroxide were added to the xylene solution, and stirring was performed while heating. Heating was performed up to 140° C., and then reflux was performed at 140° C. for 3 hours. After cooling, neutralization was performed using a phosphoric acid to adjust so that the nonvolatile content was 50 mass %, thereby obtaining a resinoid vinyl group-containing methylpolysiloxane B4.

In the obtained vinyl group-containing methylpolysiloxane B4, the number of hydrogen atoms derived from $CH_2$ groups/the number of hydrogen atoms derived from Si—$CH_3$ groups obtained by $^1$H-NMR was 0.0091. This shows that the OR/SiMe in B4 was 0.014.

Further, it is found from the charged amounts of the starting materials and the result of $^1$H-NMR that the obtained vinyl group-containing methylpolysiloxane B4 has the $M^{vi}$ unit, the M unit, the Q unit, and the OE unit, and the molar ratio among the units is $M^{vi}$ unit:M unit:Q unit:OE unit=0.044:0.397:0.559:0.018. The Mw of B4 by GPC was 2560. Besides, an average unit formula of B4 obtained from the above-described molar ratio and Mw was $M^{vi}_{1.6}M_{14.4}Q_{20.3}(OE)_{0.65}$ and the number of alkenyl groups bonded to silicon atoms in one molecule was 1.6 on average.

Synthesis Example 5

Synthesis of a Resinoid Vinyl Group-Containing Methylpolysiloxane B5

970 g (4.66 mol) of tetraethoxysilane, 70 g (0.58 mol) of chlorodimethylvinylsilane, 335 g (3.09 mol) of chlorotrimethylsilane, and 400 g of xylene were put into and stirred in a flask, and 900 g of a mixed solution of 600 g of water and 300 g of acetone was dropped thereinto. Stirring was performed at 70 to 80° C. for 1 hour and hydrolysis was performed, and then liquid separation was performed to obtain a xylene solution.

Next, 500 g of water was added to the obtained xylene solution, and water washing and liquid separation were performed to extract acetone in the xylene solution into the water. Then, the operation of water washing and liquid separation was repeated until the water used for the washing exhibited neutrality.

Subsequently, 200 g of xylene and 0.18 g of potassium hydroxide were added to the xylene solution, and stirring was performed while heating. Heating was performed up to 140° C., and then reflux was performed at 140° C. for 3 hours. After cooling, neutralization was performed using a phosphoric acid to adjust so that the nonvolatile content was 50 mass %, thereby obtaining a resinoid vinyl group-containing methylpolysiloxane B5.

In the obtained vinyl group-containing methylpolysiloxane B5, the number of hydrogen atoms derived from $CH_2$ groups/the number of hydrogen atoms derived from Si—$CH_3$ groups obtained by $^1$H-NMR was 0.0140. This shows that the OR/SiMe in B5 was 0.021.

Further, it is found from the charged amounts of the starting materials and the result of $^1$H-NMR that the obtained vinyl group-containing methylpolysiloxane B5 has the $M^{vi}$ unit, the M unit, the Q unit, and the OE unit, and the molar ratio among the units is $M^{vi}$ unit:M unit:Q unit:OE unit=0.070:0.371:0.559:0.026. The Mw of B5 by GPC was 2340. Besides, an average unit formula of B5 obtained from the above-described molar ratio and Mw was $M^{vi}_{2.3}M_{12.2}Q_{18.4}(OE)_{0.86}$ and the number of alkenyl groups bonded to silicon atoms in one molecule was 2.3 on average.

Synthesis Example 6

Synthesis of a Resinoid Vinyl Group-Containing Methylpolysiloxane B6

917 g (4.41 mol) of tetraethoxysilane, 42 g (0.35 mol) of chlorodimethylvinylsilane, 384 g (3.54 mol) of chlorotrimethylsilane, and 400 g of xylene were put into and stirred in a flask, and 900 g of a mixed solution of 600 g of water and 300 g of acetone was dropped thereinto. Stirring was performed at 70 to 80° C. for 1 hour and hydrolysis was performed, and then liquid separation was performed to obtain a xylene solution. Next, 500 g of water was added to the obtained xylene solution, and water washing and liquid separation were performed to extract acetone in the xylene solution into the water. Then, the operation of water washing and liquid separation was repeated until the water used for the washing exhibited neutrality.

Subsequently, 200 g of xylene and 0.18 g of potassium hydroxide were added to the xylene solution, and stirring was performed while heating. Heating was performed up to 140° C., and then reflux was performed at 140° C. for 3 hours. After cooling, neutralization was performed using a phosphoric acid to adjust so that the nonvolatile content was 50 mass %, thereby obtaining a resinoid vinyl group-containing methylpolysiloxane B6.

In the obtained vinyl group-containing methylpolysiloxane B6, the number of hydrogen atoms derived from $CH_2$ groups/the number of hydrogen atoms derived from Si—$CH_3$ groups obtained by $^1$H-NMR was 0.0081. This shows that the OR/SiMe in B6 was 0.012.

Further, it is found from the charged amounts of the starting materials and the result of $^1$H-NMR that the obtained vinyl group-containing methylpolysiloxane B6 has the M$^{vi}$ unit, the M unit, the Q unit, and the OE unit, and the molar ratio among the units is M$^{vi}$ unit:M unit:Q unit:OE unit=0.042:0.427:0.531:0.016. The Mw of B6 by GPC was 1620. Besides, an average unit formula of B6 obtained from the above-described molar ratio and Mw was M$^{vi}_{0.96}$M$_{9.8}$Q$_{12.1}$(OE)$_{0.37}$ and the number of alkenyl groups bonded to silicon atoms in one molecule was 0.96 on average.

Synthesis Example 7

Synthesis of a Resinoid Vinyl Group-Containing Methylpolysiloxane B7

Xylene and potassium hydroxide were added to the xylene solution after liquid separation, heating up to 140° C. and dehydration were performed, and then reflux was performed at 140° C. for 5 hours. Other than that, the same operation as in Synthesis Example 6 was performed to obtain a vinyl group-containing methylpolysiloxane B7.

In the obtained vinyl group-containing methylpolysiloxane B7, the number of hydrogen atoms derived from CH$_2$ groups/the number of hydrogen atoms derived from Si—CH$_3$ groups obtained by $^1$H-NMR was 0.0112. This shows that the OR/SiMe in B7 was 0.017.

Further, it is found from the charged amounts of the starting materials and the result of $^1$H-NMR that the vinyl group-containing methylpolysiloxane B7 has the M$^{vi}$ unit, the M unit, the Q unit, and the OE unit, and the molar ratio among the units is M$^{vi}$ unit:M unit:Q unit:OE unit=0.042: 0.427:0.531:0.023. he Mw of B7 by GPC was 2000. Besides, an average unit formula of B7 obtained from the above-described molar ratio and Mw was M$^{vi}_{1.2}$M$_{12.0}$Q$_{14.9}$(OE)$_{0.65}$ and the number of alkenyl groups bonded to silicon atoms in one molecule was 1.2 on average.

Synthesis Example 8

Synthesis of Resinoid Vinyl Group-Containing Methylpolysiloxane B8

970 g of tetraethoxysilane, 70 g of chlorodimethylvinylsilane, 335 g of chlorotrimethylsilane, and 400 g of xylene were put and stirred in a flask, and 600 g of water was dropped therein, and thereafter hydrolysis was performed by stirring at 70 to 80° C. for 20 minutes. A vinyl group-containing methylpolysiloxane B8 was obtained similarly to Synthesis example 2 except the above.

In the obtained vinyl group-containing methylpolysiloxane B8, the number of hydrogen atoms derived from CH$_2$ groups in ethoxy groups/the number of hydrogen atoms derived from Si—CH$_3$ groups which was found by $^1$H-NMR was 0.0228. This shows that the OR/SiMe in B8 was 0.034.

Further, it is found from the charged amounts of the starting materials and the result of $^1$H-NMR that the vinyl group-containing methylpolysiloxane B8 has the M$^{vi}$ unit, the M unit, the Q unit, and the OE unit, and the molar ratio among the units is M$^{vi}$ unit:M unit:Q unit:OE unit=0.070: 0.371:0.559:0.043. The Mw of B8 by GPC was 1940. Besides, an average unit formula of B8 obtained from the above-described molar ratio and Mw was M$^{vi}_{1.9}$M$_{10.0}$Q$_{15.1}$(OE)$_{1.16}$ and the number of alkenyl groups bonded to silicon atoms in one molecule was 1.9 on average.

Synthesis Example 9

Synthesis of a Polymethylhydrogensiloxane C1

1390 g (0.44 mol) of polymethylhydrogensiloxane represented on average by a formula: MD$^H_{50}$M, 1406 g (4.75 mol) of octamethylcyclotetrasiloxane, and 83 g (0.51 mol) of hexamethyldisiloxane, together with 25 g of activated clay were put into and stirred in a flask, and made to undergo an equilibration reaction at 50 to 70° C. for 6 hours. Note that in the following description, "represented on average by a formula: XX" is expressed by "represented by an average formula: XX".

Next, the reaction solution was filtrated to remove the activated clay, then the temperature was increased up to 140° C. under a reduced pressure of 5 mmHg or less, and then heating and stirring were performed at 140 to 150° C. for 6 hours under the reduced pressure.

The polymethylhydrogensiloxane C1 thus obtained is found to be represented by an average formula: MD$^H_{23}$D$_{20}$M (the number of silicon atoms of 45) from the charged amounts of the starting materials. The content rate of the Si-bonded hydrogen atoms in C1 obtained from this formula was 7.6 mmol/g.

Synthesis Example 10

Synthesis of a Polymethylhydrogensiloxane C2

1985 g (0.40 mol) of polymethylhydrogensiloxane represented by an average formula: MD$^H_{80}$M, and 1421 g (4.80 mol) of octamethylcyclotetrasiloxane, together with 30 g of activated clay were put into and stirred in a flask, and made to undergo an equilibration reaction at 50 to 70° C. for 6 hours.

Next, the reaction solution was filtrated to remove the activated clay, then the temperature was increased up to 130° C. under a reduced pressure of 5 mmHg or less, and then heating and stirring were performed at 130 to 140° C. for 6 hours under the reduced pressure.

The polymethylhydrogensiloxane C2 thus obtained is found to be represented by an average formula: MD$^H_{80}$D$_{48}$M (the number of silicon atoms of 130) from the charged amounts of the starting materials. The content rate of the Si-bonded hydrogen atoms in C2 obtained from this formula was 9.4 mmol/g.

Synthesis Example 11

Synthesis of a Polymethylhydrogensiloxane C3

1153 g (0.32 mol) of polymethylhydrogensiloxane represented by an average formula: MD$^H_{58}$M, and 1373 g (4.64 mol) of octamethylcyclotetrasiloxane, together with 20 g of activated clay were put into and stirred in a flask, and made to undergo an equilibration reaction at 50 to 70° C. for 6 hours.

Next, the reaction solution was filtrated to remove the activated clay, then the temperature was increased up to 130° C. under a reduced pressure of 5 mmHg or less, and then heating and stirring were performed at 130 to 140° C. for 6 hours under the reduced pressure.

The polymethylhydrogensiloxane C3 thus obtained is found to be represented by an average formula: MD$^H_{58}$D$_{58}$M (the number of silicon atoms of 118) from the charged amounts of the starting materials. The content rate of the Si-bonded hydrogen atoms in C3 obtained from this formula was 7.3 mmol/g.

Synthesis Example 12

Synthesis of a Polymethylhydrogensiloxane C4

500 g of toluene, 830 g (4.0 mol) of tetraethoxysilane, and 760 g (8.0 mol) of dimethylchlorosilane were charged and uniformly dissolved. This was dropped into excessive water put in a reaction container equipped with a stirrer, a dropping apparatus, a heating and cooling apparatus, and a pressure reducing apparatus while being stirred, and cohydrolysis and condensation were performed at room temperature while heat of solution of a by-produced hydrochloric acid was being removed by cooling. An obtained organic phase was washed with water until the washing water exhibited neutrality and then dehydrated, and toluene and a by-produced tetramethyldisiloxane were distilled off at 100° C/667 Pa (5 mmHg) to obtain a liquid polymethylhydrogensiloxane C4.

The obtained polymethylhydrogensiloxane C4 was found to be a polymethylhydrogensiloxane in a resin structure represented by a formula: $M^H{}_8Q_4$ from a ratio between units ($M^H$:Q=2:1) obtained by the measurement of $^{29}$Si-NMR and an Mw of 775 obtained by GPC. The content rate of the Si-bonded hydrogen atoms in the polymethylhydrogensiloxane C4 was 10.3 mmol/g.

Example 1

400 parts by mass (hereinafter, referred to simply as parts) of a straight-chain dimethylpolysiloxane A1 (the viscosity of 70 Pa·s) having both ends terminated with dimethylvinylsiloxy groups, and 1200 parts of a xylene solution (50 mass %) of the resinoid methylpolysiloxane B1 (the Mw of 3400, the number of vinyl groups in one molecule of 2.0 on average, the OR/SiMe=0.013) obtained in Synthesis Example 1 were mixed together (the mass ratio of mixture of (A1):(B1))=4:6 by nonvolatile content) and heated to 150° C. under a reduced pressure, and thereby xylene was removed.

Subsequently, 100 parts of the thus obtained vinyl group-containing polymer mixture (1), 9.3 parts of the methylhydrogenpolysiloxane C1 represented by an average formula: $MD^H{}_{23}D_{20}M$ obtained in Synthesis Example 9 (the molar ratio of the Si-bonded hydrogen atoms in the (C1) component to the vinyl groups in the vinyl group-containing polymer mixture (1) (H/Vi)=1.8), and such an amount of the (D) platinum complex solution having a tetramethyltetravinylcyclotetrasiloxane as a ligand that it was 5 ppm of the whole composition as a Pt component were mixed together to prepare a polyorganosiloxane composition.

Example 2

28 parts of the straight-chain dimethylpolysiloxane A1 (a viscosity of 70 Pa·s) having both ends terminated with dimethylvinylsiloxy groups was further mixed with 72 parts of the same vinyl group-containing polymer mixture (1) (a mass ratio of a mixture, (A1):(B1)=4:6 by nonvolatile content) as the one used in Example 1, to prepare a vinyl group-containing polymer mixture (2).

100 parts of the thus obtained vinyl group-containing polymer mixture (2), 5.7 parts (a molar ratio (H/Vi) of Si—H in the (C2) component to vinyl groups in the vinyl group-containing polymer mixture (2)=1.8) of the methylhydrogenpolysiloxane C2 obtained in Synthesis example 10 and represented by the average formula: $MD^H{}_{80}D_{48}M$, and an amount in which the (D) platinum complex solution having a tetramethyltetravinylcyclotetrasiloxane as a ligand was 5 ppm of the whole of a composition as a Pt content were mixed with one another, to prepare a polyorganosiloxane composition.

Examples 3 to 6

The straight-chain dimethylpolysiloxane A1 having both ends terminated with dimethylvinylsiloxy groups, any one of the resinoid methylpolysiloxanes B3 to B5 obtained in Synthesis examples 3 to 5 as the (B) component, any one of the methylhydrogenpolysiloxanes C1 and C3 to C4 obtained in Synthesis examples 9 and 11 to 12 as the (C) component, and the (D) platinum complex solution having a tetramethyltetravinylcyclotetrasiloxane as a ligand were compounded at each of the ratios presented by Table 1 and mixed together similarly to Example 1 to prepare polyorganosiloxane compositions.

Examples 7 to 9

A straight-chain dimethyldiphenylpolysiloxane A2 (a viscosity of 80 Pa·s) represented by a unit formula: $(M^{vi})(D^{ph})_Y(D)_Z(M^{vi})$ (Y/(Y+Z)=0.05), having both ends terminated with dimethylvinylsiloxy groups, or a straight-chain dimethyldiphenylpolysiloxane A3 (a viscosity of 200 Pa·s) represented by a unit formula: $(M^{vi})(D^{ph})_Y(D)_Z(M^{vi})$ (Y/(Y+Z)=0.05) having both ends terminated with dimethylvinylsiloxy groups was used as the (A) component. Further, the resinoid methylpolysiloxane B1 or B2 obtained in Synthesis example 1 or 2 as the (B) component, the methylhydrogenpolysiloxane C1 obtained in Synthesis example 9 as the (C) component, and the platinum complex solution having a tetramethyltetravinylcyclotetrasiloxane as a ligand as the (D) component were used. Then, these components were compounded at each of the ratios presented by Table 1 and mixed together similarly to Example 1 to prepare polyorganosiloxane compositions.

Comparative Example 1

400 parts of a straight-chain dimethylpolysiloxane A1 (the viscosity of 70 Pa·s) having both ends terminated with dimethylvinylsiloxy groups, and 1200 parts of a xylene solution (50 mass %) of the resinoid methylpolysiloxane B8 (the Mw of 1940, the number of vinyl groups in one molecule of 1.9 on average, the OR/SiMe=0.034) obtained in Synthesis Example 8 were mixed together (the mass ratio of mixture of (A1):(B8)=4:6 by nonvolatile content) and heated to 150° C. under a reduced pressure, and thereby xylene was removed.

Subsequently, 100 parts of the obtained vinyl group-containing polymer mixture (3), 15 parts of the methylhydrogenpolysiloxane C1 represented by an average formula: $MD^H{}_{23}D_{20}M$ obtained in Synthesis Example 9 (the molar ratio of the Si-bonded hydrogen atoms in the (C1) component to the vinyl groups in the vinyl group-containing polymer mixture (3) (H/Vi)=1.9), such an amount of the (D) platinum complex solution having a tetramethyltetravinylcyclotetrasiloxane as a ligand that it was 10 ppm of the whole composition as a Pt component, and an amount in which (E) triphenyl phosphite was 30 ppm of the whole of a composition were mixed with one another, to prepare a polyorganosiloxane composition.

Comparative Examples 2 to 5, 7, and 8 the straight-chain dimethylpolysiloxane A1 having both ends terminated with dimethylvinylsiloxy groups, the resinoid methylpolysiloxane B8 obtained in Synthesis example 8, the methylhydrogenpolysiloxane C1 obtained in Synthesis example 9, the (D) platinum complex solution having a tetramethyltetravinylcyclotetrasiloxane as a ligand, and further in Comparative examples 2, 5, 7, and 8, (E) triphenyl phosphite were compounded at ratios presented in Table 2 or Table 3 and mixed together similarly to Comparative example 1 to prepare polyorganosiloxane compositions.

Comparative Example 6

28 parts of the straight-chain dimethylpolysiloxane A1 (a viscosity of 70 Pa·s) having both ends terminated with dimethylvinylsiloxy groups was further mixed with 72 parts of the same vinyl group-containing polymer mixture (3) (a mass ratio of a mixture, (A1):(B2)=4:6 by nonvolatile content) as the one used in Comparative Example 1, to prepare a vinyl group-containing polymer mixture (4).

100 parts of the obtained vinyl group-containing polymer mixture (4), 8.9 parts (a molar ratio (H/Vi) of Si—H in the (C2) component to vinyl groups in the vinyl group-containing polymer mixture (4)=1.9) of the methylhydrogenpolysiloxane C2 obtained in Synthesis example 10 and represented by the average formula: $MD^H{}_{80}D_{48}M$, and an amount in which the (D) platinum complex solution having a tetramethyltetravinylcyclotetrasiloxane as a ligand was 5 ppm of the whole of a composition as a Pt content were mixed with one another, to prepare a polyorganosiloxane composition.

Comparative Examples 9 to 12

As the (A) component, the straight-chain dimethylpolysiloxane A1 having both ends terminated with dimethylvinylsiloxy groups, or the straight-chain dimethyldiphenylpolysiloxane A2 (a viscosity of 80 Pa·s) having both ends terminated with dimethylvinylsiloxy groups in was used, as the (B) component, any one of the resinoid methylpolysiloxanes B5 to B8 obtained in Synthesis examples 5 to 8 was used. Further, the methylhydrogenpolysiloxane C1 or C3 obtained in Synthesis examples 9 or 11 as the (C) component and the platinum complex solution having a tetramethyltetravinylcyclotetrasiloxane as a ligand as the (D) component were used. These components were compounded at each of the ratios presented by Table 3 and mixed together similarly to Comparative Example 1 to prepare polyorganosiloxane compositions.

Physical properties after curing of the polyorganosiloxane compositions thus obtained in Examples 1 to 9 and Comparative examples 1 to 12 were measured and evaluated as indicated below. Further, flame retardancy and light transmittance of cured products were measured and evaluated as indicated below. The bottoms of Table 1 to Table 3 present the results.

[Physical Properties After Curing]

The polyorganosiloxane compositions obtained in Examples 1 to 9 and Comparative Examples 1 to 12 were cured by heating at 150° C. for 1 hour after molding to produce sheets each having a thickness of 2 mm. Test pieces each having a size according to JIS K6249 were cut out from the obtained sheets, and the hardness (TYPE A) at 23° C., the tensile strength [MPa], and the elongation [%] of them were measured in conformity to JIS K6249.

[Flame Retardancy]

The polyorganosiloxane compositions obtained in Examples 1 to 9 and Comparative examples 1 to 12 were cured by heating at 150° C. for 1 hour to produce sheets having thicknesses presented in Table 1 to Table 3, and a flame retardancy test in conformity to UL-94 V was performed. That is, the respective sheets were cut in a size conformable to UL-94 to produce test pieces, and the flame retardancy test was performed with respect to the test pieces to judge the flame retardancy of V-"0" (zero) to V-2. Note that in Table 1 to Table 3, a maximum value (longest combustion time) of combustion time and judgment results of flame retardancy were described. In a judgment of the flame retardancy, V-"0" (zero) levels and V-1 levels were described as they were, and the others were described as ×.

[Transmittance]

Regarding the polyorganosiloxane compositions obtained in Examples 1 to 9 and Comparative examples 1 to 12, test pieces produced the same as the test pieces used for the above-described flame retardancy test and having the same thicknesses as those were irradiated with light with a wavelength of 400 nm to measure transmittance. The transmittance was measured using a spectrophotometric colorimeter (manufactured by KONICA MINOLTA, INC., device name; CM-3500d).

TABLE 1

| | | | Exam. 1 | Exam. 2 | Exam. 3 | Exam. 4 | Exam. 5 | Exam. 6 | Exam. 7 | Exam. 8 | Exam. 9 |
|---|---|---|---|---|---|---|---|---|---|---|---|
| Composition (Part By Mass) | (A) | Both Ends Vinyl Group-Containing Straight-chain Polysiloxane A1, Viscosity 70 Pa·s | 40 | 56.8 | 46 | 46 | 46 | 55 | | | |
| | | Both Ends Vinyl Group-Containing Straight-chain Dimethyldiphenylpolysiloxane A2, Viscosity 80 Pa·s | | | | | | | | 45 | 45 |
| | | Both Ends Vinyl Group-Containing Straight-chain Dimethyldiphenylpolysiloxane A3, Viscosity 200 Pa·s | | | | | | | 45 | | |
| | (B) | Vinyl Group-Containing Resinoid Polysiloxane B1, Mw 3400, Vi 2.0 On Average/Molecule, OR/SiMe = 0.013 | 60 | 43.2 | | | | 55 | | | |
| | | Vinyl Group-Containing Resinoid Polysiloxane B2, Mw 1850, Vi 1.8 On Average/Molecule, OR/SiMe = 0.030 | | | | | | | | 55 | 55 |
| | | Vinyl Group-Containing Resinoid Polysiloxane B3, Mw 3740, Vi 2.2 On Average/Molecule, OR/SiMe = 0.013 | | | 54 | | | | | | |
| | | Vinyl Group-Containing Resinoid Polysiloxane B4, Mw 2560, Vi 1.6 On Average/Molecule, OR/SiMe = 0.014 | | | | 54 | 54 | | | | |
| | | Vinyl Group-Containing Resinoid Polysiloxane B5, Mw 2340, Vi 2.3 On Average/Molecule, OR/SiMe = 0.021 | | | | | | | 45 | | |
| | | Vinyl Group-Containing Resinoid Polysiloxane B6, Mw 1620, Vi 0.96 On Average/Molecule, OR/SiMe = 0.012 | | | | | | | | | |
| | | Vinyl Group-Containing Resinoid Polysiloxane B7, Mw 2000, Vi 1.2 On Average/Molecule, OR/SiMe = 0.017 | | | | | | | | | |
| | | Vinyl Group-Containing Resinoid Polysiloxane B8, Mw 1940, Vi 1.9 On Average/Molecule, OR/SiMe = 0.034 | | | | | | | | | |

TABLE 1-continued

|  |  |  | Exam. 1 | Exam. 2 | Exam. 3 | Exam. 4 | Exam. 5 | Exam. 6 | Exam. 7 | Exam. 8 | Exam. 9 |
|---|---|---|---|---|---|---|---|---|---|---|---|
|  | (C) | SiH-Containing Straight-chain Polysiloxane C1 (Number of Si 45), SiH 7.6 mmol/g | 9.3 |  | 8.6 |  |  |  | 8.8 | 14.4 | 17.3 |
|  |  | SiH-Containing Straight-chain Polysiloxane C2 (Number of Si 130), SiH 9.4 mmol/g |  | 5.4 |  |  |  |  |  |  |  |
|  |  | SiH-Containing Straight-chain Polysiloxane C3 (Number of Si 118), SiH 7.3 mmol/g |  |  |  | 9.2 | 9.2 |  |  |  |  |
|  |  | SiH-Containing Resinoid Polysiloxane C4 SiH 10.3 mmol/g |  |  |  |  |  | 7.7 |  |  |  |
|  | (D) | Pt-Based Catalyst (ppm) (As Pt Content) | 5 | 5 | 2 | 4 | 3 | 2 | 2 | 3 | 3 |
|  | (E) | Triphenyl Phosphite (ppm) |  |  |  |  |  |  |  |  |  |
|  |  | H/Vi Molar Ratio (H In (C) Component/Vi In (A), (B) Components) | 1.8 | 1.8 | 1.9 | 1.9 | 1.9 | 1.7 | 2.0 | 2.0 | 2.4 |
| Evaluation | Properties After Curing | Hardness (Type A) | 78 | 55 | 73 | 72 | 71 | 77 | 76 | 76 | 75 |
|  |  | Tensile Strength (MPa) | 9.1 | 5.2 | 10 | 9.2 | 9.0 | 11.6 | 4.5 | 3.6 | 3.3 |
|  |  | Elongation (%) | 120 | 250 | 120 | 140 | 130 | 100 | 60 | 40 | 40 |
|  |  | Transmittance, 400 nm (%) | 90 | 90 | 92 | 92 | 92 | 92 | 91 | 94 | 94 |
|  | Flame Retardancy | Thickness Of Test Piece (mm) | 6.0 | 6.1 | 5.9 | 6.0 | 6.0 | 5.9 | 5.0 | 3.0 | 3.0 |
|  |  | Longest Combustion Time (sec) | 8 | 9 | 18 | 11 | 16 | 28 | 24 | 9 | 3 |
|  |  | Judgment of Ul-94 V Combustion Test | V-0 | V-0 | V-1 | V-1 | V-1 | V-1 | V-1 | V-1 | V-0 |

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Composition (Part By Mass) | (A) | Both Ends Vinyl Group-Containing Straight-chain Polysiloxane A1, Viscosity 70 Pa · s | 40 | 40 | 40 | 40 | 40 | 56.8 |
|  |  | Both Ends Vinyl Group-Containing Straight-chain Dimethyldiphenylpolysiloxane A2, Viscosity 80 Pa · s |  |  |  |  |  |  |
|  |  | Both Ends Vinyl Group-Containing Straight-chain Dimethyldiphenylpolysiloxane A3, Viscosity 200 Pa · s |  |  |  |  |  |  |
|  | (B) | Vinyl Group-Containing Resinoid Polysiloxane B1, Mw 3400, Vi 2.0 On Average/Molecule, OR/SiMe = 0.013 |  |  |  |  |  |  |
|  |  | Vinyl Group-Containing Resinoid Polysiloxane B2, Mw 1850, Vi 1.8 On Average/Molecule, OR/SiMe = 0.030 |  |  |  |  |  |  |
|  |  | Vinyl Group-Containing Resinoid Polysiloxane B3, Mw 3740, Vi 2.2 On Average/Molecule, OR/SiMe = 0.013 |  |  |  |  |  |  |
|  |  | Vinyl Group-Containing Resinoid Polysiloxane B4, Mw 2560, Vi 1.6 On Average/Molecule, OR/SiMe = 0.014 |  |  |  |  |  |  |
|  |  | Vinyl Group-Containing Resinoid Polysiloxane B5, Mw 2340, Vi 2.3 On Average/Molecule, OR/SiMe = 0.021 |  |  |  |  |  |  |
|  |  | Vinyl Group-Containing Resinoid Polysiloxane B6, Mw 1620, Vi 0.96 On Average/Molecule, OR/SiMe = 0.012 |  |  |  |  |  |  |
|  |  | Vinyl Group-Containing Resinoid Polysiloxane B7, Mw 2000, Vi 1.2 On Average/Molecule, OR/SiMe = 0.017 |  |  |  |  |  |  |
|  |  | Vinyl Group-Containing Resinoid Polysiloxane B8, Mw 1940, Vi 1.9 On Average/Molecule, OR/SiMe = 0.034 | 60 | 60 | 60 | 60 | 60 | 43.2 |
|  | (C) | SiH-Containing Straight-chain Polysiloxane C1 (Number of Si 45), SiH 7.6 mmol/g | 15 | 15 | 15 | 15 | 15 |  |
|  |  | SiH-Containing Straight-chain Polysiloxane C2 (Number of Si 130), SiH 9.4 mmol/g |  |  |  |  |  | 8.9 |
|  |  | SiH-Containing Straight-chain Polysiloxane C3 (Number of Si 118), SiH 7.3 mmol/g |  |  |  |  |  |  |
|  |  | SiH-Containing Resinoid Polysiloxane C4 SiH 10.3 mmol/g |  |  |  |  |  |  |

TABLE 2-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  | (D) | Pt-Based Catalyst (ppm) (As Pt Content) | 10 | 10 | 5 | 5 | 2 | 5 |
|  | (E) | Triphenyl Phosphite (ppm) | 30 | 60 |  |  | 30 |  |
|  |  | H/Vi Molar Ratio (H In (C) Component/ Vi In (A), (B) Components) | 1.9 | 1.9 | 1.9 | 1.9 | 1.9 | 1.9 |
| Evaluation | Properties After Curing | Hardness (Type A) | 80 | 75 | 82 | 82 | 77 | 60 |
|  |  | Tensile Strength (MPa) | 10.0 | 9.8 | 10 | 10 | 9.7 | 5.6 |
|  |  | Elongation (%) | 80 | 100 | 90 | 90 | 100 | 250 |
|  |  | Transmittance, 400 nm (%) | 88 | 88 | 89 | <89 | 90 | 88 |
|  | Flame Retardancy | Thickness Of Test Piece (mm) | 5.9 | 6.0 | 6.0 | 11.9 | 6.1 | 6.1 |
|  |  | Longest Combustion Time (sec) | 40 | 36 | 220 | 31 | 242 | 228 |
|  |  | Judgment of Ul-94 V Combustion Test | X | X | X | X | X | X |

TABLE 3

|  |  |  | Comparative Example 7 | Comparative Example 8 | Comparative Example 9 | Comparative Example 10 | Comparative Example 11 | Comparative Example 12 |
|---|---|---|---|---|---|---|---|---|
| Composition (Part By Mass) | (A) | Both Ends Vinyl Group-Containing Straight-chain Polysiloxane A1, Viscosity 70 Pa · s | 40 | 40 | 41.5 | 46 | 55 |  |
|  |  | Both Ends Vinyl Group-Containing Straight-chain Dimethyldiphenylpolysiloxane A2, Viscosity 80 Pa · s |  |  |  |  |  | 45 |
|  |  | Both Ends Vinyl Group-Containing Straight-chain Dimethyldiphenylpolysiloxane A3, Viscosity 200 Pa · s |  |  |  |  |  |  |
|  | (B) | Vinyl Group-Containing Resinoid Polysiloxane B1, Mw 3400, Vi 2.0 On Average/Molecule, OR/SiMe = 0.013 |  |  |  |  |  |  |
|  |  | Vinyl Group-Containing Resinoid Polysiloxane B2, Mw 1850, Vi 1.8 On Average/Molecule, OR/SiMe = 0.030 |  |  |  |  |  |  |
|  |  | Vinyl Group-Containing Resinoid Polysiloxane B3, Mw 3740, Vi 2.2 On Average/Molecule, OR/SiMe = 0.013 |  |  |  |  |  |  |
|  |  | Vinyl Group-Containing Resinoid Polysiloxane B4, Mw 2560, Vi 1.6 On Average/Molecule, OR/SiMe = 0.014 |  |  |  |  |  |  |
|  |  | Vinyl Group-Containing Resinoid Polysiloxane B5, Mw 2340, Vi 2.3 On Average/Molecule, OR/SiMe = 0.021 |  |  |  |  | 45 |  |
|  |  | Vinyl Group-Containing Resinoid Polysiloxane B6, Mw 1620, Vi 0.96 On Average/Molecule, OR/SiMe = 0.012 |  |  | 58.5 |  |  |  |
|  |  | Vinyl Group-Containing Resinoid Polysiloxane B7, Mw 2000, Vi 1.2 On Average/Molecule, OR/SiMe = 0.017 |  |  |  | 54 |  |  |
|  |  | Vinyl Group-Containing Resinoid Polysiloxane B8, Mw 1940, Vi 1.9 On Average/Molecule, OR/SiMe = 0.034 | 60 | 60 |  |  |  | 55 |
|  | (C) | SiH-Containing Straight-chain Polysiloxane C1 (Number of Si 45) SiH 7.6 mmol/g | 15 | 15 |  |  |  | 12 |
|  |  | SiH-Containing Straight-chain Polysiloxane C2 (Number of Si 130) SiH 9.4 mmol/g |  |  |  |  |  |  |
|  |  | SiH-Containing Straight-chain Polysiloxane C3 (Number of Si 118) SiH 7.3 mmol/g |  |  | 9.4 | 8.3 | 10.9 |  |
|  |  | SiH-Containing Resinoid Polysiloxane C4, SiH 10.3 mmol/g |  |  |  |  |  |  |
|  | (D) | Pt-Based Catalyst (ppm) (As Pt Content) | 20 | 30 | 2 | 2 | 2 | 3 |
|  | (E) | Triphenyl Phosphite (ppm) | 30 | 30 |  |  |  |  |
|  |  | H/Vi Molar Ratio (H In (C) Component/ Vi In (A), (B) Components) | 1.9 | 1.9 | 1.8 | 1.8 | 1.7 | 1.6 |

TABLE 3-continued

|  |  |  | Comparative Example 7 | Comparative Example 8 | Comparative Example 9 | Comparative Example 10 | Comparative Example 11 | Comparative Example 12 |
|---|---|---|---|---|---|---|---|---|
| Evaluation | Properties After Curing | Hardness (Type A) | 82 | 83 | 68 | 67 | 65 | 68 |
|  |  | Tensile Strength (MPa) | 10 | 11 | 8.8 | 8.0 | 8.0 | — |
|  |  | Elongation (%) | 80 | 80 | 130 | 210 | 150 | — |
|  |  | Transmittance, 400 nm (%) | 84 | 82 | 92 | 92 | 92 | 94 |
|  | Flame Retardancy | Thickness Of Test Piece (mm) | 6.2 | 6.2 | 5.9 | 5.9 | 6.0 | 3.0 |
|  |  | Longest Combustion Time (sec) | 24 | 8 | 227 | 132 | 57 | 128 |
|  |  | Judgment of Ul-94 V Combustion Test | V-1 | V-0 | X | X | X | X |

The following is found from the measurement results in Table 1 to Table 3. That is, despite a significant reduction to 5 mass ppm or less of the whole of a composition in a content rate of a platinum-based metal compound, the polyorganosiloxane compositions of Examples 1 to 9 in which the respective components of (A) to (D) are compounded in a predetermined composition prescribed by the present invention exhibit high flame retardancy and have the V-"0" (zero) or V-1 level in the evaluation of the flame retardancy in UL-94 V. Further, cured products thereof have high light transmittance of 85% or more, are excellent in transparency, and further the physical properties such as hardness, tensile strength, and elongation are also good.

Note that the polyorganosiloxane compositions of Examples 8 and 9 contain the resinoid polyorganosiloxane B2 in which OR/SiMe is 0.030, as the (B) component. This OR/SiMe value is higher compared with values of OR/SiMe of the resinoid polyorganosiloxanes B1 and B3 to B5 which are compounded in other Examples (1 to 6, 7), and there is a concern for an effect of alkoxy groups (OR) which the (B) component has on the flame retardancy, but since a dimethylphenylpolysiloxane containing phenyl groups in a predetermined range is used as the straight-chain diorganopolysiloxane of the (A) component, the high flame retardancy is considered to be obtained as the whole of the composition.

In contrast, in the polyorganosiloxane compositions of Comparative examples 1 to 6 and Comparative example 12, the resinoid polyorganosiloxane B8 in which OR/SiMe is more than 0.030 is compounded as the (B) component, so that the flame retardancy is not good, and specifically the flame retardancy in UL-94 V does not reach the V-1 level. The polyorganosiloxane compositions of Comparative examples 1, 2, and 5 contain triphenyl phosphite being the (E) flame retardant in high amounts, but the flame retardancy is poor.

Further, the polyorganosiloxane compositions of Comparative examples 7 and 8 exhibit high flame retardancy of the V-"0" (zero) or V-1 level in the flame retardancy in UL-94 V, but the light transmittance is less than 85%, which is not sufficient in the light transmittance. That is, in Comparative examples 7 and 8, the resinoid polyorganosiloxane in which OR/SiMe is more than 0.030 is compounded as the (B) component, the platinum complex solution which is the (D) component is added several times to several tens times as much as those in Examples 1 to 9 as a Pt content, and triphenyl phosphite being the (E) flame retardant is compounded, and thereby the flame retardancy becomes good. But compounding the Pt content in high amounts causes a decrease in transparency. Specifically, in Comparative examples 7 and 8, the light transmittance is less than 85% in a thickness of about 6 mm, resulting in considerable decrease compared with Examples 1 to 12.

In the polyorganosiloxane compositions of Comparative examples 9 and 10, the resinoid polyorganosiloxane B6 or B7 in which the number of vinyl groups bonded to silicon atoms is less than 1.5 on average is compounded as the (B) component, so that the flame retardancy is not good, and specifically the flame retardancy in UL-94 V does not reach the V-1 level.

Moreover, in the polyorganosiloxane composition of Comparative example 11, the resinoid polyorganosiloxane B5 in which OR/SiMe is 0.030 or less but relatively high (0.021) is contained as the (B) component, and in addition, the straight-chain hydrogenpolysiloxane is compounded as the (C) component, so that sufficient flame retardancy cannot be obtained. In contrast, in the polyorganosiloxane composition of Example 6, the same resinoid polyorganosiloxane B5 as that in Comparative example 11 is contained as the (B) component, and furthermore, compositions of the (A) component and the (D) component are also the same as that in Comparative example 11, but the polymethylhydrogensiloxane C4 having not a straight-chain chain but a resin structure is compounded as the (C) component, so that good flame retardancy can be obtained.

Example 10

A polyorganosiloxane composition having the same composition as that in Example 6 was prepared.

This polyorganosiloxane composition was cured by heating at 150° C. for 1 hour to produce a sheet having a thickness of 6.1 mm, a flame retardancy test in conformity to UL-94 V and UL-94 5V was performed, and the flame retardancy was evaluated. Table 4 presents an evaluation result. In evaluation of the flame retardancy, a maximum value (longest combustion time) of combustion time and a judgment result of flame retardancy was described.

TABLE 4

|  |  |  | Example 10 |
|---|---|---|---|
| Flame Retardancy Evaluation | UL-94 V | Thickness of Test Piece (mm) | 6.1 |
|  |  | Longest Combustion Time (sec) | 11 |
|  |  | Judgement | V-1 |
|  | UL-94 5 V | Thickness of Test Piece (mm) | 6.1 |
|  |  | Longest Combustion Time (sec) | 32 |
|  |  | Judgement | 5VA |

It is found from Table 4 that the polyorganosiloxane composition in Example 10 having the same composition as that in Example 6 reaches the V-1 level in evaluation in UL-94 V and in addition, passes with 5VA also in evaluation in UL-94 5V which is a surface ignition test, thereby having the high flame retardancy.

According to a flame-retardant polyorganosiloxane composition of the present invention, it is possible to obtain a cured product having sufficient rubber hardness and having excellent flame retardancy. Further, coloring and discoloration (yellowing) of the cured product are suppressed, so that transparency of the cured product is good. Moreover, because a compounding amount of a platinum-based metal compound can be reduced, high flame retardancy can be achieved without causing an increase in a material cost.

Accordingly, this flame-retardant cured product is suitable as an optical member such as a sealing material of a light-emitting element in a light-emitting device, for example an LED device, and a functional lens and the like. In particular, suitable use as a lens and cover of an outdoor light source and an automobile light source is possible.

What is claimed is:

1. A flame-retardant polyorganosiloxane composition comprising:
    (A) a straight-chain polyorganosiloxane having two or more alkenyl groups bonded to silicon atoms on average in one molecule and having a viscosity at 25° C. of 10,000 to 1,000,000 mPa·s;
    (B) 30 to 80 mass % of a polyorganosiloxane relative to a total of the (A) component and this component, the polyorganosiloxane having a resin structure which includes a tetrafunctional siloxane unit represented by a formula: $SiO_{4/2}$, has one or more substituted or unsubstituted alkyl groups bonded to silicon atoms in one molecule and more than "0" zero alkoxy groups bonded to silicon atoms in one molecule, and has 1.5 or more alkenyl groups bonded to silicon atoms on average in one molecule and in which a molar ratio (a number of moles of alkoxy groups/a number of moles of substituted or unsubstituted alkyl groups) of the alkoxy groups to the substituted or unsubstituted alkyl groups is more than "0" zero and 0.030 or less;
    (C) an amount of a polyorganohydrogensiloxane which has hydrogen atoms bonded to silicon atoms, whose average degree of polymerization is 10 or more, and in which a content of the hydrogen atoms is 5.0 mmol/g or more, in which the hydrogen atoms in the component are 1.0 to 3.0 mol relative to a total of 1 mol of the alkenyl groups in the (A) component and the alkenyl groups in the (B) component; and
    (D) a catalyst amount of a hydrosilylation reaction catalyst.

2. The flame-retardant polyorganosiloxane composition according to claim 1, wherein the (A) component includes a straight-chain polyorganosiloxane represented by
    a formula: $(R^1_{3-m}R^2_{m}SiO_{1/2})(R^1R^2SiO_{2/2})_X(R^2_{2}SiO_{2/2})_Y(R^1_{2}SiO_{2/2})_Z(R^1_{3-n}R^2_{n}SiO_{1/2})$
    where each $R^1$ is independently an alkenyl group or a substituted or unsubstituted alkyl group, and at least two of a plurality of $R^1$s are alkenyl groups, $R^2$ is a phenyl group, m is "0" (zero) or 1 and n is "0" (zero) or 1, X and Y are "0" (zero) or a positive integer and Z is a positive integer, and a relation of $0.02 \leq (X+Y)/(X+Y+Z) \leq 0.10$ is satisfied.

3. The flame-retardant polyorganosiloxane composition according to claim 2, wherein the (A) component includes a straight-chain polyorganosiloxane represented by a formula: $(R^1_{3}SiO_{1/2})(R^2_{2}SiO_{2/2})_Y(R^1_{2}SiO_{2/2})_Z(R^1_{3}SiO_{1/2})$ where $R^1$ and $R^2$ are the same as described above, both Y and Z are a positive integer, and a relation of $0.02 \leq Y/(Y+Z) \leq 0.06$ is satisfied.

4. The flame-retardant polyorganosiloxane composition according to claim 1, wherein the straight-chain polyorganosiloxane being the (A) component has a viscosity at 25° C. of 50,000 to 500,000 mPa·s.

5. The flame-retardant polyorganosiloxane composition according to claim 1, wherein in the (B) component, a number of moles of alkoxy groups bonded to silicon atoms/a number of moles of substituted or unsubstituted alkyl groups bonded to silicon atoms is 0.020 or less.

6. The flame-retardant polyorganosiloxane composition according to claim 1, wherein the (B) component includes an alkenyl group-containing polyorganosiloxane having a resin structure which contains a monofunctional siloxane unit represented by a formula: $R^1_{3}SiO_{1/2}$, a bifunctional siloxane unit represented by a formula: $R^1_{2}SiO_{2/2}$, and a tetrafunctional siloxane unit (Q unit) represented by a formula: $SiO_{4/2}$ at a molar ratio of monofunctional siloxane unit:bifunctional siloxane unit:Q unit=a:b:c where each $R^1$ is independently an alkenyl group or a substituted or unsubstituted alkyl group, and 1.5 $R^1$s are alkenyl groups on average in one molecule, a, b, and c are $0.3 \leq a \leq 0.6$, "0" (zero)$\leq b \leq 0.1$, and $0.4 \leq c \leq 0.7$, and a relationship of a+b+c=1 is established on average.

7. The flame-retardant polyorganosiloxane composition according to claim 1, wherein the (B) component includes:
    a monofunctional siloxane unit represented by a formula: $(CH_3)_2(CH_2=CH)SiO_{1/2}$;
    a monofunctional siloxane unit represented by a formula: $(CH_3)_3SiO_{1/2}$; and
    a tetrafunctional siloxane unit represented by a formula: $SiO_{4/2}$.

8. The flame-retardant polyorganosiloxane composition according to claim 1, wherein the (B) component has two or more alkenyl groups bonded to silicon atoms on average in one molecule.

9. The flame-retardant polyorganosiloxane composition according to claim 1, wherein the (B) component has a weight-average molecular weight Mw by gel permeation chromatography (GPC) of 2200 or more.

10. The flame-retardant polyorganosiloxane composition according to claim 1, wherein a content rate of the (B) component to a total of the (A) component and the (B) component is 35 to 70 mass %.

11. The flame-retardant polyorganosiloxane composition according to claim 1, wherein the (C) component includes at least a polyorganohydrogensiloxane having a three-dimensional network structure which contains a monofunctional siloxane unit represented by a formula: $(R^3_{2}HSiO_{1/2})$ where each $R^3$ is independently a substituted or unsubstituted monovalent hydrocarbon group except an alkenyl group, and a tetrafunctional siloxane unit represented by a formula: $SiO_{4/2}$.

12. The flame-retardant polyorganosiloxane composition according to claim 1, wherein the (D) hydrosilylation reaction catalyst is a platinum-based metal compound.

13. The flame-retardant polyorganosiloxane composition according to claim 12, wherein a content rate of the platinum-based metal compound relative to a whole of the composition is 0.5 to 5 mass ppm in terms of a platinum element.

14. The flame-retardant polyorganosiloxane composition according to claim 1, containing no inorganic filler and a transmittance of light with a wavelength of 400 nm of 85% or more in a cured product having a thickness of 6 mm.

15. A flame-retardant cured product made by curing the flame-retardant polyorganosiloxane composition according to claim 1, wherein evaluation of flame retardancy of a test piece with a thickness of 10 mm or less in conformity to UL-94 is V-1 or V-"0" (zero).

16. A flame-retardant cured product made by curing the flame-retardant polyorganosiloxane composition according to claim 1, wherein evaluation of flame retardancy of a test piece with a thickness of 10 mm or less in conformity to UL-94 is 5VB or 5VA.

17. An optical member and a light source lens or cover made by curing the flame-retardant polyorganosiloxane composition according to claim 1.

18. The optical member and the light source lens or cover according to claim 17, wherein the optical member is at least one kind selected from a primary or secondary lens for LED, a thick optical lens, a reflector for LED, an automobile LED matrix lighting lens, an augmented reality optical member, a silicone optical head for an LED chip, and a work light lens and reflector.

19. The optical member and the light source lens or cover according to claim 17, wherein the light source is at least one kind selected from indoor or outdoor lighting, a reading light and accent lighting of public transport, and an LED street light.

20. The optical member and the light source lens or cover according to claim 17, wherein the optical member is at least one kind selected from an illumination optical member for smartphone or tablet, an LED display for computer or television, and a light guide.

21. A molding method comprising: molding by a method selected from injection molding, compression molding, transfer molding, potting, and dispensing using the flame-retardant polyorganosiloxane composition according to claim 1.

22. The flame-retardant polyorganosiloxane composition according to claim 1, wherein in the (B) component, a number of moles of alkoxy groups bonded to silicon atoms/a number of moles of substituted or unsubstituted alkyl groups bonded to silicon atoms is 0.013 or more to 0.030 or less.

* * * * *